(12) United States Patent
Maeda et al.

(10) Patent No.: US 6,873,383 B1
(45) Date of Patent: Mar. 29, 2005

(54) LIQUID CRYSTAL DEVICE AND ELECTRONIC APPARATUS

(75) Inventors: Tsuyoshi Maeda, Yamanashi-ken (JP); Osamu Okumura, Chino (JP); Eiji Okamoto, Matsumoto (JP); Takumi Seki, Misato-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/445,523

(22) PCT Filed: Apr. 7, 1999

(86) PCT No.: PCT/JP99/01864

§ 371 (c)(1),
(2), (4) Date: Dec. 7, 1999

(87) PCT Pub. No.: WO99/53368

PCT Pub. Date: Oct. 21, 1999

(30) Foreign Application Priority Data

Apr. 8, 1998 (JP) .......................................... 10-096497
Jun. 9, 1998 (JP) .......................................... 10-160866

(51) Int. Cl.⁷ ........................................... G02F 1/1335
(52) U.S. Cl. ...................................... 349/113; 349/114
(58) Field of Search ......................... 349/113–114, 106

(56) References Cited

U.S. PATENT DOCUMENTS

| | | | | |
|---|---|---|---|---|
| 3,978,580 A | * | 9/1976 | Leupp et al. | 349/143 |
| 4,682,858 A | * | 7/1987 | Kanbe et al. | 349/149 |
| 5,667,853 A | * | 9/1997 | Fukuyoshi et al. | 428/1.62 |
| 5,815,228 A | * | 9/1998 | Flynn | 349/71 |
| 6,552,765 B2 | * | 4/2003 | Kurata | 349/113 |

FOREIGN PATENT DOCUMENTS

| | | |
|---|---|---|
| JP | 06-313890 | 11/1994 |
| JP | 06-337432 | 12/1994 |
| JP | 07-120730 | 5/1995 |
| JP | 07-318929 | 12/1995 |
| JP | 08-129186 | 5/1996 |
| JP | 8-136939 | 5/1996 |
| JP | 08-292413 | 11/1996 |
| JP | 09-061854 | 3/1997 |
| JP | 9-258246 | 10/1997 |
| JP | 11-052366 | 2/1999 |
| JP | 2002-196350 | * 7/2002 |

OTHER PUBLICATIONS

Communication from Japan re: counterpart application.

* cited by examiner

*Primary Examiner*—Dung Nguyen
(74) *Attorney, Agent, or Firm*—Harness, Dickey & Pierce, P.L.C.

(57) ABSTRACT

Ambient light incident upon a polarizer 105 passes through a liquid crystal layer 103 and is then reflected by reflective films 116 via transparent electrodes 115. The reflected light passes again through the liquid crystal layer 103 and the polarizer 105 and is output to the outside thereby displaying an image in a reflective displaying mode. The reflective films 116 are disposed at locations corresponding to the respective transparent electrodes 115 such that they are spaced from each other. In this structure, some ambient light passes through the spaces between adjacent transparent electrodes 115, however, such light is not reflected by the reflective films 116 toward the outside and thus a reduction in contrast due to such reflection is prevented.

19 Claims, 11 Drawing Sheets

LIQUID CRYSTAL DEVICE AND ELECTRONIC APPARATUS

This Application is a 371 of PCT/JP99/01864 filed Apr. 7, 1999

TECHNICAL FIELD

The present invention relates to the field of liquid crystal devices, and more particularly to the structure of liquid crystal devices of reflective type and of transflective type, and also to an electronic apparatus using such a liquid crystal device.

BACKGROUND ART

Various types of liquid crystal devices are known in the art. They include a reflective liquid crystal device which displays an image by reflecting ambient light through a liquid crystal by reflecting means provided in the device, a transmissive type liquid crystal device in which light emitted from a light source provided in the device is passed through a liquid crystal and output to the outside thereby forming an image, and a transflective liquid crystal device capable of switching its displaying mode between reflective and transmissive modes.

Of these liquid crystal devices, reflective liquid crystal devices can operate with very low power consumption because they need no light source. Because of such an advantage, the reflective liquid crystal device is widely used as a display unit in portable devices and other various systems.

In the transflective liquid crystal device, an image is displayed in the transmissive mode using a light source when used in a dark environment. However, when used in a light environment, an image is displayed using ambient light as in the reflective liquid crystal device, and thus it needs low power consumption. Because of such an advantage, the transflective liquid crystal device is widely used as a display unit in portable devices and other various systems. A typical transflective liquid crystal device is, as disclosed in, for example, Japanese Utility Model Publication No. 57-049271, composed of a polarizer, a transflector, and a backlight which are successively disposed on the outer surface, opposite to the viewing side, of a liquid crystal panel. A transflective liquid crystal device with improved brightness is disclosed in Japanese Unexamined Patent Publication No. 8-292413. In this liquid crystal device, a transflector, a polarizer, and a backlight are successively disposed on the outer surface, opposite to the viewing side, of a liquid crystal panel. Because there is no polarizer between the liquid crystal cell and the transflector, an image with improved brightness can be displayed.

With recent advances in portable devices and office automation devices, there is an increasing need for color liquid crystal devices. In many cases, the capability of displaying a color image is also required in systems or devices using a reflective or transflective liquid crystal device. To realize a liquid crystal device having the capability of displaying a color image in the reflective or transflective mode, a color filter having a large number of colored areas of R (red), G (green), and B (blue) is disposed on one of a pair of substrates between which a liquid crystal is disposed. To avoid mixing among different colored areas of the color filter, and to avoid a reduction in the contrast ratio due to light-struck (white defects) caused by the spaces between adjacent colored areas, a light shielding film generally called a black mask or a black matrix is disposed in the spaces between adjacent colored areas.

However, an essential problem of the reflective liquid crystal device described above is that because an image is displayed using ambient light, it is difficult or impossible to see the image in a dark environment. To obtain better viewability, it is important to increase the reflectance to ambient light incident on the liquid crystal device, and also to increase the ratio of light which is reflected and output from the liquid crystal device to the outside as display light which makes contribution to display contrast relative to the total ambient light input to the device. However, in the reflective liquid crystal device described above, the reflectance and the ratio of output light to input light are not sufficiently high. In the case of the reflective liquid crystal device in which a transparent substrate is disposed between the liquid crystal layer and the reflector, the problem is that double images or dull images occur in an image displayed. If a color filter is combined with this liquid crystal device, parallax makes it difficult to obtain desired colors. When the liquid crystal device includes a color filter, if a structure including no black matrix is employed to avoid absorption of light by the black matrix thereby increasing the image brightness, then light passing through spaces between adjacent colored areas is reflected by the reflector. This causes a greater part of ambient light to be output from the liquid crystal device without making any contribution to the image contrast or formation of an image, and thus causes a reduction in the contrast ratio. Japanese Unexamined Patent Publication No. 9-258219 discloses a reflective color liquid crystal device in which a reflector is disposed in contact with a liquid crystal layer. Also in this liquid crystal device, if spaces between adjacent colored areas of the color filter are not covered with a black mask so as to increase the image brightness as described above, some ambient light, which passes through the spaces located between adjacent colored areas and covered with no black mask, is reflected by the reflector and output in mixture with imaging light to the outside of the liquid crystal device. This results in mixing colors, and it makes the colors dull or faded. Further, a contrast ratio is reduced.

As described above, the problem of the conventional reflective liquid crystal device has difficulty of displaying an image with a high brightness and a high contrast.

The transflective liquid crystal device disclosed in Japanese Unexamined Patent Publication No. 8-292413 cited above also has similar problems associated with double images and dull images because a transparent substrate is disposed between a liquid crystal layer and a transflector. Also in this case, if a color filter is combined with this liquid crystal device, parallax makes it difficult to obtain desired colors. Japanese Unexamined Patent Publication No. 7-318929 discloses a transflective liquid crystal device in which pixel electrodes which also serve as transflective films are formed on the inner surface of a liquid crystal cell. This patent cited herein also discloses a structure in which pixel electrodes formed of ITO (indium tin oxide) are laminated on a transflective film formed of a metal film via an insulating film. However, in this liquid crystal device, it is required to form a large number of very small defects such as hole defects or recessed defects or very small openings in the pixel electrodes which also serve as the transflective films or in the transflective films on which the pixel electrodes are formed. This results in an increase in the complexity of the device. Furthermore, a special process is additionally required to produce the openings. This makes it difficult to produce the pixel electrodes or transflective films with high reliability. In particular, when the pixel electrodes are formed such that they also serve as the transflective films, it is required that, in the transmissive displaying mode, portions of the liquid crystal, through which light emitted from a light source passes after passing through openings, be driven by oblique electric fields generated by pixel electrodes located in non-opening areas. As a result, degradation in image quality occurs due to variations in orientation of the liquid crystal compared with the case where the liquid crystal is driven by vertical electric fields.

On the other hand, in the case where the pixel electrodes are formed via an insulating film on the respective transflective films formed of metal, adjacent pixel electrodes are capacitively coupled with each other via capacitors formed of the respective pixel electrode, the insulating films, and the transflective films, and further via the transflective films. As a result, signals such as image signals supplied to the plurality of pixel electrodes are mixed with one another or have cross-talk with one another. Hence, the signals have distortion in the waveforms, which results in degradation in quality of the image displayed. In particular, when the pixel electrodes are also used as the data lines or segment electrodes via which image signals having complicated waveforms and having a high driving frequency compared with the scanning electrodes are supplied, the degradation in quality becomes more serious.

As described above, the conventional transflective liquid crystal device has the problem that it is difficult to display a high-brightness and high-contrast image.

SUMMARY OF THE INVENTION

In view of the above, an object of the present invention is to provide a reflective or transflective liquid crystal device capable of displaying a high-brightness and high-contrast image without producing double images or dull images due to parallax, and also an electronic apparatus using such a liquid crystal device.

A first liquid crystal device according to the present invention can achieve the above object. The first liquid crystal device comprises: a pair of first and second substrates; a liquid crystal layer disposed between the first and second substrates; a plurality of transparent electrodes which are formed on a surface, on the side of the liquid crystal layer, of the second substrate such that the plurality of transparent electrodes are spaced from each other in a horizontal direction when seen in a direction perpendicular to the second substrate; and reflective films formed between the plurality of transparent electrodes and the second substrate, in areas opposing the respective plurality of transparent electrodes, wherein the reflective films are not formed in an area opposing at least some part of a space between the plurality of transparent electrodes.

In this first liquid crystal device according to the present invention, some part of ambient light input from the side of the first substrate passes through the transparent electrodes and such a part of ambient light is reflected toward the liquid crystal layer by the reflective films formed in the areas opposing the transparent electrodes, thereby forming an image in a reflective displaying mode. In this first liquid crystal device, because the reflective films are disposed on the surface, on the side of the liquid crystal layer, of the second substrate, there is substantially no space between the reflective films and the liquid crystal layer, and thus double images or dull images are prevented, which would otherwise occur due to parallax. On the other hand, some part of ambient light input from the side of the first substrate passes through spaces between adjacent transparent electrodes. If such a part of light is reflected toward the liquid crystal layer, a defect known as a bright defect (white defect) occurs, which results in a reduction in the contrast. However, in the first liquid crystal device according to the present invention, the part of ambient light which passes through the spaces between adjacent electrodes after entering from the side of the first substrate further passes through areas where there is no reflective film opposing the above-described spaces, and thus such light is never reflected by the reflective films toward the liquid crystal layer. Therefore, it is possible to suppress degradation in image quality due to mixing of imaging light which is reflected by the reflective films and output to the outside with light which passes through the spaces between adjacent transparent electrodes.

In one mode of the first liquid crystal device according to the present invention, the reflective films comprise a plurality of reflective films spaced from each other in correspondence with the plurality of transparent electrodes.

In this mode, the part of ambient light which passes through the plurality of transparent electrodes is reflected by the plurality of reflective films spaced from each other in correspondence with the plurality of transparent electrodes, whereas the part of ambient light which passes through the spaces between adjacent transparent electrodes is not reflected.

In another mode of the first liquid crystal device according to the present invention, the first liquid crystal device further comprises a color filter formed on at least one of the first and second substrates, the color filter including colored areas corresponding to the plurality of transparent electrodes, wherein the color filter includes no light shielding area in an area opposing at least some part of a space between the plurality of transparent electrodes.

In this mode, the part of light, which passes through the transparent electrodes via the colored areas of the color filter, is reflected by the reflective films thereby displaying a color image in a reflective displaying mode. Herein, the color filter includes no light shielding area at least in those areas which oppose the spaces between the plurality of transparent electrodes and in which there is no reflective film. Therefore, ambient light can pass through the spaces between adjacent colored areas, which are not covered with light shielding areas. However, in those areas, there is no reflective film, which reflects such light. Therefore, mixing of colors between adjacent colored areas is prevented, which would otherwise occur owing to reflection by the reflective films. Thus, a color image is prevented from having dull images or blurring due to mixing of colors.

In still another mode of the first liquid crystal device according to the present invention, an insulating film is disposed between each transparent electrode and each reflective film.

In this mode, because the insulating film is disposed between each transparent electrode and each corresponding reflective film, the reflective films are allowed to be formed of a conductive material such as Al without causing electrical leakage or short circuits among the plurality of transparent electrodes via the reflective films. This also allows the pattern, in the horizontal plane, of the reflective films to be designed in a more flexible fashion.

Alternatively, the transparent electrodes may be formed directly on the reflective films. In this case, the transparent electrodes are electrically connected to the corresponding reflective films. Therefore, if the reflective films are formed of a conductive material such as Al, the stripe-shaped or island-shaped reflective films serve as redundant structures for the corresponding transparent electrodes. As a result, the electrode resistance or the interconnection resistance associated with the transparent electrodes can be reduced.

The above-described object can also be achieved by a second liquid crystal device according to the present invention. The second liquid crystal device comprises: a pair of first and second substrates; a liquid crystal layer disposed between the first and second substrates; a plurality of transparent electrodes formed on a surface, on the side of the liquid crystal layer, of the second substrate; a plurality of conductive reflective films which are formed between the plurality of transparent electrodes and the second substrate in correspondence with the respective plurality of transparent electrodes, the plurality of reflective films being electrically isolated from each other; and an insulating film disposed between each of the plurality of transparent electrodes and each of the plurality of reflective films.

In this second liquid crystal device according to the present invention, some part of ambient light input from the side of the first substrate passes through the transparent electrodes and such a part of light is reflected toward the liquid crystal layer by the reflective films formed in the areas opposing the transparent electrodes, thereby forming an image in a reflective displaying mode. In this first liquid crystal device, because the reflective films are disposed on the surface, on the side of the liquid crystal layer, of the second substrate, there is substantially no space between the reflective films and the liquid crystal layer, and thus double images or dull images are prevented, which would otherwise occur due to parallax. Thus, each transparent electrode and each corresponding reflective film is disposed opposing each other via the insulating film. That is, a pair of conductors is disposed on both sides of a dielectric. As a result, a capacitor is formed by these three elements. However, because the plurality of conductive reflective films are not electrically connected to one another, the capacitors formed by the respective transparent electrodes are isolated from one another, and thus adjacent transparent electrodes are never capacitively coupled to each other via such capacitors and conductive reflective films. This effectively prevents image signals applied to the plurality of transparent electrodes from being mixed together or having cross-talk via capacitive coupling. Therefore, a high-quality image can be displayed in the reflective displaying mode without producing waveform distortion.

The object described above can also be achieved by a third liquid crystal device-according to the present invention. The third liquid crystal device comprises: a pair of first and second substrates; a liquid crystal layer disposed between the first and second substrates; a plurality of transparent electrodes formed on a surface, on the side of the liquid crystal layer, of the second substrate; a plurality of conductive transflective films which are formed between the plurality of transparent electrodes and the second substrate in correspondence with the respective plurality of transparent electrodes, the plurality of transflective films being electrically isolated from each other; an insulating film disposed between each of the plurality of transparent electrodes and each of the plurality of transflective films; and an illuminating apparatus disposed on a side of the second substrate, opposite to the side where the liquid crystal layer is disposed.

In this third liquid crystal device according to the present invention, some part of ambient light input from the side of the first substrate passes through the transparent electrodes and such a part of light is reflected toward the liquid crystal layer by the:reflective films formed in the areas opposing the transparent electrodes, thereby forming an image in a reflective displaying mode. In this liquid crystal device, because the:reflective films are disposed on the surface, on the side of the liquid crystal layer, of the second substrate, there is substantially no space between the reflective films and the liquid crystal layer, and thus double images and dull images are prevented, which would otherwise occur due to parallax. On the other hand, in the transmissive displaying mode, light emitted from the illuminating apparatus and input from the side of the second substrate passes through the transflective films and the transparent electrodes into the side of the liquid crystal layer thereby displaying a high-brightness image using light source light in a dark environment. In this third liquid crystal device, each transparent electrode and each corresponding reflective film are disposed opposing each other via the insulating film. That is, a pair of conductors is disposed on both sides of a dielectric. As a result, a capacitor is formed by these three elements. However, because the plurality of conductive reflective films are not electrically connected to one another, the capacitors formed by the respective transparent electrodes are electrically isolated from one another, and thus adjacent transparent electrodes are never capacitively coupled to each other via such capacitors and conductive reflective films. This effectively prevents image signals applied to the plurality of transparent electrodes from being mixed together or having cross-talk via capacitive coupling. Therefore, a high-quality image can be displayed in the reflective displaying mode without producing waveform distortion.

The transflective films may be formed, for example, by disposing a plurality of reflective films such that they are spaced a predetermined distance away from each other or by forming small openings in the respective reflective films such that the ratio of each opening area to each reflective film area has a predetermined value. The insulating film may be formed by oxidizing the surface of the reflective films or by disposing two or more different insulating films into a multilayer structure. In many cases, the voltage vs. reflectance (transmittance) characteristic of the liquid crystal cell in the reflective displaying mode is different from that in the transmissive displaying mode. Therefore, it is desirable that the driving voltage in the reflective displaying mode and the driving voltage in the transmissive displaying mode be set to different values optimized independently of each other.

In one mode of the second or third liquid crystal device according to the present invention, there is further provided image signal supplying means disposed on the second substrate, for supplying an image signal to the plurality of transparent electrodes.

In this mode, image signals are preferably supplied to the transparent electrodes by the image signal supplying means including, for example, a data line, a sampling circuit, a data line driving circuit, or the like. The image signals have a complicated waveform and a high driving frequency compared with other signals such as a scanning signal. Therefore, if the image signals mix with one another or have cross-talk with one another via capacitive coupling as described earlier, large distortion in waveforms occurs. However, in this mode, because the plurality of conductive reflective films are not electrically connected to one another, image signals are effectively prevented from being mixed together or having cross-talk via capacitive coupling.

In another mode of the second or third liquid crystal device according to the present invention, there are further provided a plurality of switching elements disposed on the second substrate and connected to the plurality of transparent electrodes, respectively.

In this mode, image signals are supplied to the respective transparent electrodes via switching elements such as TFTs (thin film diodes) or TFDs (thin film diodes) and a high-quality image is displayed by means of active addressing.

Various known addressing methods are applicable to the above-described third liquid crystal devices according to the present invention. They include a passive matrix addressing method, a TFT active matrix addressing method, a TFD active matrix addressing method, and a segment addressing method. The transparent electrode on the second substrate may be formed into a proper shape such as a plurality of stripes or segments depending on the addressing method. On the first substrate, a plurality of stripe-shaped or segment-shaped transparent electrodes may be formed, or a single transparent electrode may be formed over the substantially entire surface of the first substrate. Alternatively, instead of forming the opposite electrode on the first substrate, addressing may be performed using an electric field generated between some transparent electrodes on the second substrate in a horizontal direction parallel to the substrate. Furthermore, in the first to third liquid crystal devices, a polarizer, a retardation plate, and other elements are disposed on a side, opposite to the liquid crystal layer, of the first or second substrate as required depending on the addressing method.

The above-described object can also be achieved by a first electronic apparatus including the first liquid crystal device according to the present invention.

According to the first electronic apparatus of the present invention, it is possible to realize various types of electronic apparatuses using a reflective liquid crystal device or a reflective color liquid crystal device capable of displaying, in a reflective displaying mode, a high-brightness and high-contrast image including no ghost and no dull images due to parallax.

The above-described object can also be achieved by a second electronic apparatus including the second liquid crystal device according to the present invention.

According to the second electronic apparatus of the present invention, it is possible to realize various types of electronic apparatuses using a reflective liquid crystal device or a reflective color liquid crystal device capable of displaying, in a reflective displaying mode, a high-brightness and high-contrast image including no ghost and no dull images due to parallax.

The above-described object can also be achieved by a third electronic apparatus including the third liquid crystal device according to the present invention.

According to the third electronic apparatus of the present invention, it is possible to realize various types of electronic apparatuses using a transflective liquid crystal device or a transflective color liquid crystal device capable of displaying, in both a reflective displaying mode and a transmissive fashion, a high-brightness and high-contrast image including no ghost and no dull images due to parallax. The first to third electronic apparatuses can display a high-quality image without being affected by ambient light regardless of whether it is used in a light or dark environment.

These and other features and advantages of the present invention will become more apparent from the following detailed description referring to preferred embodiments.

BRIEF DESCRIPTION OF THE DRAWING

FIG. 10b is a graph illustrating the reflectance R and transmittance T vs. driving voltage characteristic of the liquid crystal device under the conditions shown in FIG. 10a.

BEST MODE FOR CARRYING OUT THE INVENTION

The present invention is further described below with reference to best modes for respective embodiments in conjunction with the accompanying drawings.

First Embodiment

Figure 1:
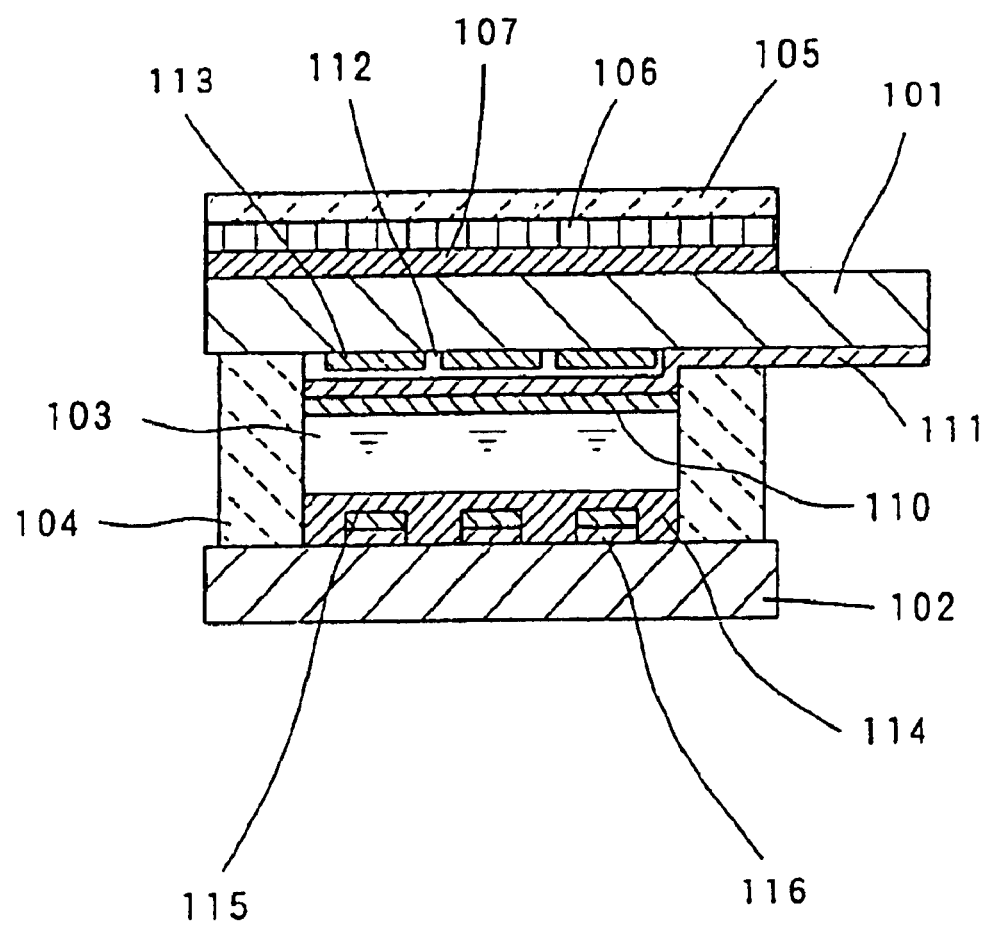
FIG. 1 is a longitudinal sectional view schematically illustrating the structure of a liquid crystal device according to a first embodiment of the present invention.

A first embodiment of a liquid crystal device according to the present invention is described below with reference to FIGS. 1–2b. FIG. 1 is a longitudinal sectional view schematically illustrating the structure of the first embodiment of the liquid crystal device according to the present invention. Although this embodiment is basically concerned with a passive matrix type liquid crystal device, the structure disclosed herein may also be applied to other types of liquid crystal devices such as an active matrix type device, a segment type device, etc.

In this reflective liquid crystal device of the first embodiment, as shown in FIG. 1, there is provided a liquid crystal cell including a liquid crystal layer 103 sealed between two transparent substrates 101 and 102 and within a frame-shaped sealing member 104. The liquid crystal layer 103 is formed of a nematic liquid crystal with a particular twisted angle. A color filter 113 is formed on the inner surface of the upper transparent substrate 101. The color filter 113 includes three colored layers of R (red), G (green), and B (blue) with predetermined patterns. The surface of the color filter 113 is coated with a transparent protective film 112. A plurality of stripe-shaped transparent electrodes 111 are formed of an ITO (indium tin oxide) film or the like on the surface of this protective film 112. An alignment layer 110 is formed over the surface of the transparent electrodes 111 and subjected to a rubbing process in a predetermined direction.

On the inner surface of the lower transparent or opaque substrate 102, a plurality of stripe-shaped transparent electrodes 115 are formed on respective stripe-shaped reflective films 116, formed at locations corresponding to the respective colored layers of the color filter 113 described above, in such a manner that the transparent electrodes 115 cross the transparent electrodes 111.

In the case of an active matrix type device including TFDs or TFTs, each transparent electrode 115 is formed in a rectangular shape and connected to an interconnection via an active device.

The reflective films 116 are formed of a material such as Cr (chromium), Al (aluminum), or Ag (silver), and the surface thereof serves as a reflection plane for reflecting light incident from the side of the transparent substrate 101. Over the surface of the transparent electrodes 115, an alignment layer 114 is formed and subjected to a rubbing process in a predetermined direction.

In this first embodiment, as described above, the transparent electrodes 115 are spaced from each other when they are viewed from a direction perpendicular to the substrate. The reflective films 116 are formed between the respective transparent electrodes 115 and the substrate 102 in areas opposing the transparent electrodes 115 and no reflective film is formed in spaces between the adjacent transparent electrodes 115.

Figure 2A:
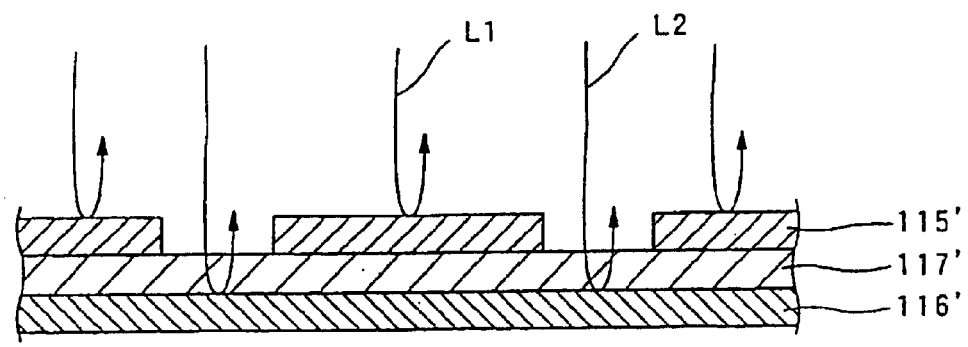
FIG. 2a is a diagram schematically illustrating the manner in which ambient light is reflected by a reflective film via a transparent electrode in a comparative example.
Figure 2B:
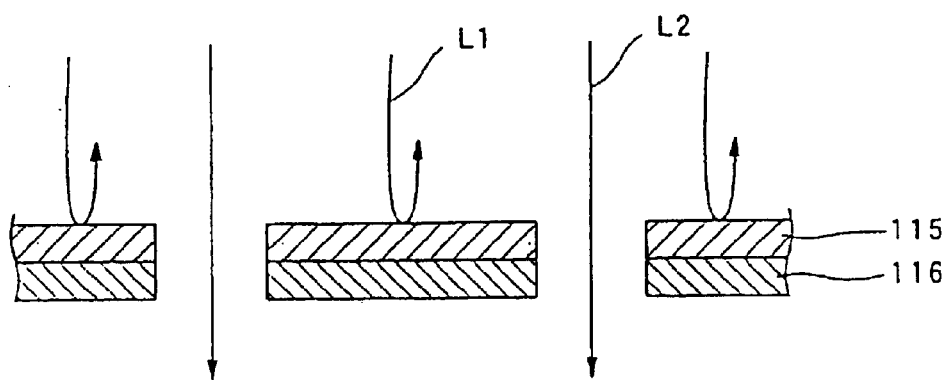
FIG. 2b is a diagram schematically illustrating the manner in which ambient light is reflected by a reflective film via a transparent electrode in the first embodiment.

Referring now to FIG. 2a and FIG. 2b, reflection of ambient light performed, in this first embodiment, by the transparent electrodes 115 laminated on the reflective films 116 is described below. FIG. 2a shows a comparative example including stripe-shaped transparent electrodes 115' formed on an insulating film 117' on a reflective film 116' which is formed on a substrate over its entire surface, wherein the manner in which ambient light is reflected by the reflecting electrode 116' is schematically illustrated. FIG. 2b is a diagram schematically illustrating a manner of reflecting ambient light by the transparent electrodes 115 laminated on the reflective films 116 according to the first embodiment.

In the comparative example, as shown in FIG. 2a, ambient light L1 is reflected by the reflective film 116' via the transparent electrodes 115' in respective pixels. This means that those parts of the liquid crystal through which ambient light L1 passes can be effectively driven by the transparent electrode 116'. However, ambient light L2 passing through the spaces between adjacent transparent electrodes 115' (that is, the spaces between adjacent pixels) is reflected by the reflective film 116' and output, in mixture with ambient light L1 which makes contribution to forming an image, to the outside of the liquid crystal device without making contribution to displaying the image (instead, ambient light L2 causes a reduction in the contrast ratio of the displayed image). As a result, degradation in display quality occurs.

In contrast, in the first embodiment, as shown in FIG. 2b, ambient light L1 is reflected by the reflective films 116 via the transparent electrodes 115 in respective pixels, wherein the reflective films 116 are formed in the areas opposing the transparent electrodes 115 but not formed in spaces between adjacent transparent electrodes 115. Therefore, those parts of the liquid crystal through which ambient light L1 passes can be effectively driven by the transparent electrodes 116. In the present embodiment, ambient light L2 passing through spaces between adjacent transparent electrodes 115 (that is, spaces between adjacent pixels) further passes through spaces between adjacent reflective films 116. Therefore, in this case, no ambient light L2 is output, in mixture with ambient light L1 making contribution to displaying an image, to the outside of the liquid crystal device without making any contribution to displaying the image (instead, such ambient light L2 would cause a reduction in the contrast ratio of the displayed image). Therefore, as opposed to the comparative example, no degradation occurs in the image quality due to light passing through spaces between adjacent stripe-shaped or island-shaped transparent electrodes. In the present embodiment, each transparent electrode 115 and each corresponding reflective film 116 may be equal in size, or each transparent electrode 115 may be slightly greater in size than each corresponding reflective film 116. No reflective film 116 may be formed in some spaces between adjacent transparent electrodes 115 whereas reflective films 116 may be formed in the other spaces between adjacent transparent electrodes 115. Alternatively, instead of spacing the reflective films 116 from each other, openings may be formed in a single reflective film 116, in areas corresponding to the spaces between adjacent transparent electrodes. However, because those portions of the reflective films 116 on which there is no overlapping transparent electrode 115 do not contribute to forming an image (but result in a reduction in the contrast ratio), they are basically unnecessary. To effectively utilize an image displaying area limited in size, it is desirable to design the layout in a horizontal plane such as to minimize the portions of the reflective films 116 on which there is no overlapping transparent electrode 115.

Referring again to FIG. 1, a polarizer 105 is disposed on the outer surface of the upper transparent substrate 101, and a retardation plate 106 and a scattering plate 107 are disposed between the polarizer 105 and the transparent substrate 101. Light reflected by the Al reflective films 116 is output to the outside after being diffused by the scattering plate 107 over a wide angle range. Thus, the scattering plate 107 allows the reflective films 116 having a mirror surface to serve in effect as a scattering surface (white surface). The scattering plate 107 may be disposed at any location as long as it is on the opposite side of the transparent substrate 101 to the side on which the liquid crystal layer 103 is located. However, if the back scattering effect (the effect of scattering incident ambient light toward the side from which light is incident) of the scattering plate 107 is taken into account, it is desirable to dispose the scattering plate 107 between the polarizer 105 and the transparent substrate 101 as in the present embodiment. In the reflective liquid crystal device, such back scattering does not make any contribution to displaying an image but causes a reduction in the contrast. If the scattering plate 107 is disposed between the polarizer 105 and the transparent substrate 101, the amount of back-scattered light is reduced by the polarizer 105 by approximately half.

Referring to FIG. 1, the operation of displaying an image performed by the reflective liquid crystal device of the present embodiment is described below.

Ambient light incident from the upper side in FIG. 1 onto the liquid crystal device passes through the polarizer 105, the retardation plate 106, and the scattering plate 107. The light further passes through the color filter 113 and the liquid crystal layer 103 and is then reflected by the reflective films 116. The reflected light is output to the outside via the polarizer 105. In this reflective displaying mode, the intensity of output light is controlled to a bright, dark, or intermediate level in response to the voltage applied to the liquid crystal layer 103.

The structure according to the present embodiment makes it possible to realize a color liquid crystal device capable of displaying an image without producing double images or a dull images. In the present embodiment, some part of ambient light incident from the side of the transparent substrate 101 passes through the spaces between adjacent transparent electrodes 115. However, such light is never reflected by the reflective films 116 toward the liquid crystal layer 103, and thus degradation in the image quality is suppressed.

In the present embodiment, the color filter 113 is formed such that its colored areas are located opposing the transparent electrodes 115. However, the color filter 113 has no light shielding areas at locations corresponding to the spaces between adjacent transparent electrodes 115. Therefore, ambient light can pass through the spaces between adjacent colored areas. However, in the spaces between adjacent colored areas, there is no reflective film 116, which reflects such light. This prevents mixing of colors between adjacent colored areas of the color filter 113, which would otherwise occur due to reflection by the reflective films 116. Thus, a color image is prevented from having dull images or blurring due to mixing of colors. On the other hand, the above-described structure of the color filter 113 including no light shielding area results in an increase in brightness of the image displayed in the reflective displaying mode.

The color filter 113 may be formed such that there is no light shielding area in any space between colored areas or such that there are light shield areas in some spaces between colored areas. Furthermore, the color filter may be disposed on the transparent substrate 101 as described above or may be disposed together with the reflective films 116, the insulating film, the color filter, and the transparent electrodes 115 into a multilayer structure on the substrate 102 such that the color filter 113 is located between the layers of the insulating film and the transparent electrodes 115. Instead, the color filter 113 may be disposed together with the reflective films 116, the insulating film, the protective film, and the transparent electrodes 115 into a multilayer structure such that the color filter is located between the layers of the insulating film and the protective film.

Furthermore, in the present embodiment, because the transparent electrodes 115 are formed directly on the reflective films 116, both the Al reflective films 116 and the ITO transparent electrodes 115 serve as electrode lines. This results in a reduction in resistance of each electrode line. Preferably, each reflective film 116 contains 95 wt% or more aluminum and has a thickness in the range from 10 nm to 40 nm.

Furthermore, the scattering plate 107 disposed on the upper surface of the liquid crystal cell serves to output light reflected by the Al reflective films 116 such that the light is diffused over a wide range of angles. This makes it possible to realize a liquid crystal device with a wide viewing angle.

Second Embodiment

Figure 3:
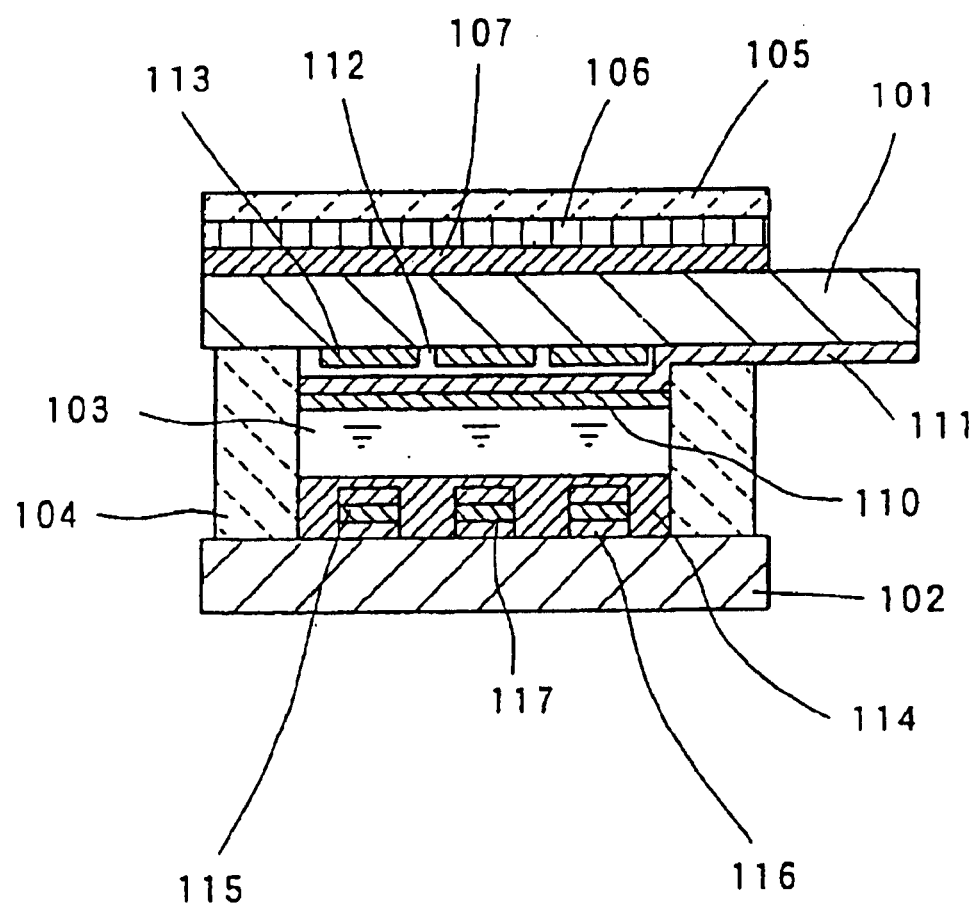
FIG. 3 is a longitudinal sectional view illustrating the general structure of a liquid crystal device according to a second embodiment of the present invention.

A second embodiment of a liquid crystal device according to the present invention is described below with reference to FIG. 3. FIG. 3 is a longitudinal sectional view illustrating the structure of the liquid crystal device according to the second embodiment of the invention. This third embodiment is similar in construction to the first embodiment described above except that transparent electrodes and reflective films are formed in a different structure. In FIG. 3, similar constituent elements to those in the first embodiment described above with reference to FIG. 1 are denoted by similar reference numerals, and thereby they will be omitted.

In th e reflective liquid crystal device of the second embodiment, as shown in FIG. 3, an insulating film 117 is formed between each reflective film 116 and each transparent electrode 115. The other parts are similar to those of the first embodiment. An example of the process of forming the insulating film 117 is described below.

First, reflective films are formed into the shape of islands or stripes corresponding to the respective dots by evaporating, for example, aluminum to a thickness of 50 nm to 300 nm. The reflective films are then anodized so as to form $Al_2O_3$(aluminum oxide) serving as the insulating layer on the surface of the reflective films. The anodization may be performed using a solution containing 1–10 wt % ammonium salicylate and 20–80 wt % ethylene glycol under conditions of a formation voltage of 5 to 250 V and a current density of 0.001 to 0.1 $mA/cm^2$. T his technique makes it possible to form the insulating film, which is very thin and highly resistant. If the thickness of the oxide film is selected to be equal to 140 nm or an integral multiple of this value, then coloring due to interference can be prevented. By employing aluminum as a material for forming the reflective films, it becomes possible to maintain a high reflectance after the oxidation. The formation of the insulating film by means of oxidation may also be performed using thermal oxidation. The insulating film may be formed in a multilayer structure consisting of a plurality of insulating film layers. More specifically, after forming an oxide film by anodizing a reflective film of metal, an upper insulating film may be formed by coating an organic material on the oxide film using a spin-coating technique, or a $SiO_2$ film or the like may be evaporated on the oxide film.

Thus, in this second embodiment, each transparent electrode 115 and each corresponding reflective film 116 are disposed opposing each other via a corresponding insulating film 117. That is, a pair of conductors are disposed on both sides of a dielectric. As a result, a capacitor is formed by these three elements. If the respective reflective films 116 are electrically connected to one another, adjacent transparent electrodes 115 are capacitively coupled to each other via capacitors formed in the above-described manner and via the conductive reflective films 116. In this second embodiment, however, because the plurality of conductive reflective films 116 are not electrically connected to one another, the capacitors corresponding to the respective transparent electrodes 115 are isolated from one another, and thus such capacitive coupling does not occur. This prevents image signals applied to the plurality of transparent electrodes 115 from being mixed together or having cross-talk via capacitive coupling.

Therefore, a high-quality image can be displayed in the reflective displaying-mode without producing waveform distortion.

In this second embodiment, image signals are preferably supplied to the transparent electrodes 115 via data lines, a sampling circuit, a data line driving circuit, or the like. The image signals have a complicated waveform and a high driving frequency compared with other signals such as a scanning signal. However, because the plurality of conductive reflective films 116 are not electrically connected to each other, image signals are effectively prevented from being mixed together or having cross-talk via capacitive coupling. In contrast, the scanning signal has a rather simple waveform and a low driving frequency. Therefore, significant signal degradation due to the coupling does not occur.

Furthermore, in this second embodiment, because the insulating films 117 are disposed between the respective transparent electrodes 115 and the corresponding reflective films 116, the reflective films 116 are allowed to be formed of an conductive material such as Al without causing electrical leakage or short circuits among the plurality of transparent electrodes 115 via the reflective films 116. This also allows the pattern, in the horizontal plane, of the reflective films 116 to be designed in a more flexible fashion.

As described above, the structure according to the present embodiment makes it possible to realize a color liquid crystal device capable of displaying an image with a high brightness and a high contrast in a reflective displaying mode without producing dull images or double images.

Third Embodiment

Figure 4:
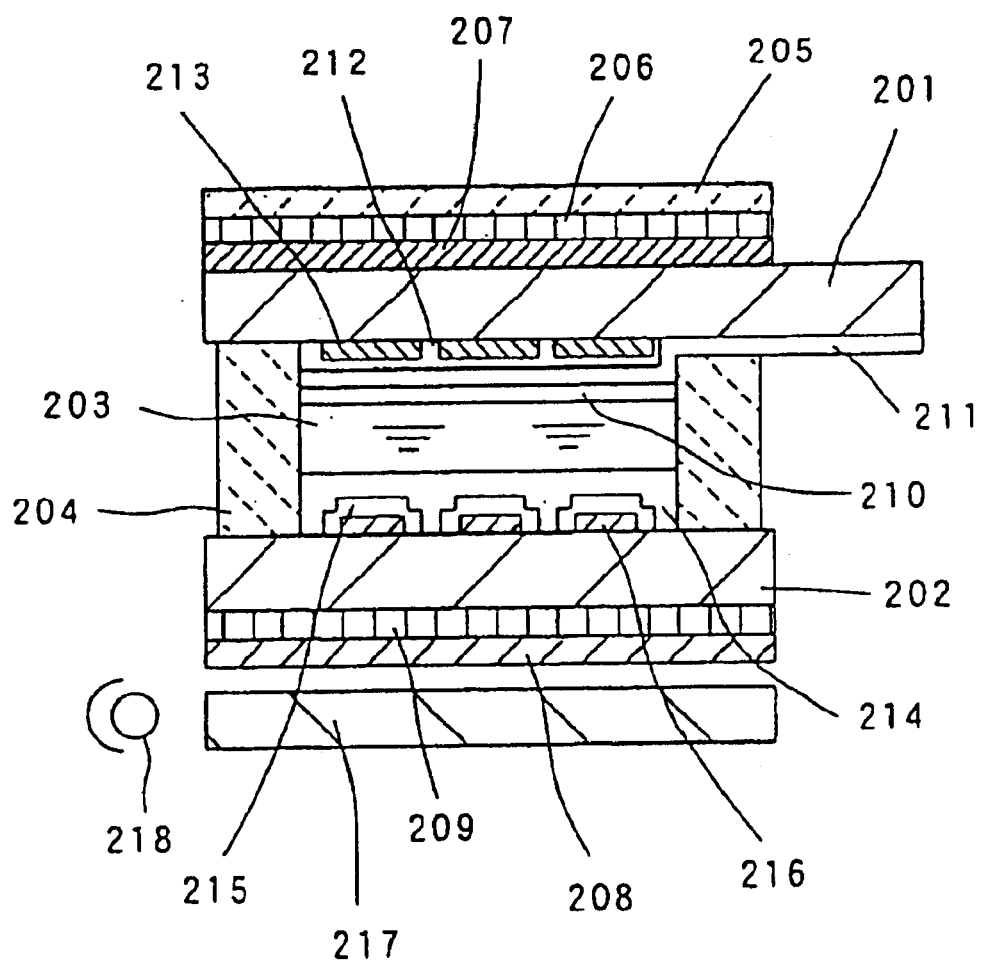
FIG. 4 is a longitudinal sectional view illustrating the general structure of a liquid crystal device according to a third embodiment of the invention.

A third embodiment of a liquid crystal device according to the present invention is described below with reference to FIGS. 4 to 6. FIG. 4 is a longitudinal sectional view schematically illustrating the structure of the third embodiment of the liquid crystal device according to the present invention. Although this embodiment is basically concerned with a passive matrix type liquid crystal device, the structure disclosed herein may also be applied to other types of liquid crystal devices such as an active matrix type device, a segment type device, etc.

In the transflective liquid crystal device of the third embodiment, as shown in FIG. 4, there is provided a liquid crystal cell including a liquid crystal layer 203 sealed between two transparent substrates 201 and 202 and within a frame-shaped sealing member 204. The liquid crystal layer 203 is formed of a nematic liquid crystal with a particular twisted angle. A color filter 213 is formed on the inner surface of the upper transparent substrate 201. The color filter 213 includes three colored layers of R (red), G (green), and B (blue) with predetermined patterns. The surface of the color filter 213 is coated with a transparent protective film 212. A plurality of stripe-shaped transparent electrodes 211 are formed of an ITO (indium tin oxide) film or the like on the surface of this protective film 212. An alignment layer 210 is formed over the surface of the transparent electrodes 211 and subjected to a rubbing process in a predetermined direction.

On the inner surface of the lower transparent substrate 202, stripe-shaped transparent electrodes 215 slightly greater in area than the reflective films 216 are formed on the stripe-shaped reflective films 216 formed at locations corresponding to the respective colored layers of the color filter 213 described above, in such a manner that the transparent electrodes 215 cross the transparent electrodes 211.

In the case of an active matrix type device including TFDs or TFTs, each transparent electrode 215 is formed in a rectangular shape and connected to an interconnection via an active device.

The reflective film 216 is formed of Cr, Al, Ag, or the like, and the surface thereof serves as a reflection plane for reflecting light incident from the side of the transparent substrate 201. On the surface of the transparent electrode 215, an alignment layer 214 is formed and subjected to a rubbing process in a predetermined direction.

Thus, in this third embodiment, the plurality of reflective films 216 are arranged in a stripe fashion such that they are spaced a predetermined distance apart from each other so that the spaces between adjacent reflective films 216 serve to pass light emitted from a backlight. Preferably, the reflective films 216 are spaced from each other by a distance in the range from 0.01 $\mu$m to 20 $\mu$m so that the spaces are not easily perceived by users and thus degradation in image quality due to the spaces is minimized, thereby allowing an image to be displayed in both reflective and transmissive modes. Furthermore, it is desirable that the ratio of the area of each space between adjacent reflective films 216 to the area of each reflective film 216 is set to a value in the range of 5% to 30% so that the reduction in the brightness is minimized in the reflective displaying mode whereas an image is also allowed to be displayed in the transmissive mode using light supplied via the spaces between reflective films.

Referring to FIG. 4, a polarizer 205 is disposed on the outer surface of the upper transparent substrate 201, and a retardation plate 206 and a diffusing plate 207 are disposed between the polarizer 205 and the transparent substrate 201. On the lower side of the liquid crystal cell, a retardation plate 209 is disposed at the back of the transparent substrate 202, and a polarizer 208 is disposed at the back of the retardation plate 209. Furthermore, on the lower side of the polarizer 208, there is disposed a backlight including a fluorescent tube 218 for emitting white light and a light guiding plate 217 having a light incident end face extending along the fluorescent tube 218. The light guiding plate 217 is formed of a transparent material such as acrylic resin in such a manner that its entire back surface becomes rough so as to serve as a scattering surface. Light emitted from the fluorescent tube 218 serving as a light source is input into the light guiding plate 217 through its end face, and light is output substantially uniformly through the upper surface. Other types of backlights such as an LED (light emitting diode) or an EL (electroluminescence) lamp may also be employed.

Light reflected by the Al reflective films 216 is output to the outside after being scattered by the scattering plate 207 over a wide range of angles. Thus, the scattering plate 207 allows the reflective films 216 having a mirror surface to serve in effect as a scattering surface (white surface). The scattering plate 207 may be disposed at any location as long as it is on the opposite side of the transparent substrate 201 to the side on which the liquid crystal layer 203 is located. However, if the back scattering effect (the effect of scattering incident ambient light toward the side from which light is incident) of the scattering plate 207 is taken into account, it is desirable to dispose the scattering plate 207 between the polarizer 205 and the transparent substrate 201 as in the present embodiment. In the reflective liquid crystal device, such back scattering does not make any contribution to displaying an image but causes a reduction in the contrast. If the scattering plate 207 is disposed between the polarizer 205 and the transparent substrate 201, the amount of back-scattered light is reduced by the polarizer 205 by approximately half.

In this third embodiment, as described above, the polarizer 205 and the retardation plate 206 are disposed on the upper side of the liquid crystal cell, and the polarizer 208 and the retardation plate 209 are disposed on the lower side of the liquid crystal cell so that a high-quality image can be displayed in both the reflective and transmissive modes. More specifically, the retardation plate 206 suppresses the effects of wavelength dispersion of light, such as coloring, upon the color tone in the reflective displaying mode (that is, the retardation plate 206 serves to optimize the displaying conditions in the reflective displaying mode), and furthermore, the retardation plate 209 also suppresses the effects of wavelength dispersion of light, such as coloring, upon the color tone in the transmissive displaying mode (that is, the retardation plate 206 serves to optimize the displaying conditions in the transmissive displaying mode under the conditions where the displaying conditions in the reflective displaying mode is optimized by the retardation plate 209). It desired, a plurality of retardation plates 206 or 209 may be disposed so as to compensate for coloring of the liquid crystal cell or compensate for the viewing angle. By disposing a plurality of retardation plates 206 or 209, it becomes easier to optimize compensation for coloring or the viewing angle. Furthermore, it also becomes possible to adjust the optical conditions associated with the polarizer 205, the retardation plate 106, the liquid crystal layer 103, and the reflective films 216 such as to increase the contrast in the reflective displaying mode, and further adjust, under the above conditions, the optical conditions associated with the polarizer 208 and the retardation plate 209 such as to increase the contrast in the transmissive displaying mode, thereby achieving a high contrast in both the reflective and transmissive displaying modes.

Referring to FIG. 4, the operation of displaying an image in reflective and transmissive modes according to the present embodiment is described below.

In the reflective displaying mode, ambient light incident from the upper side in FIG. 4 onto the liquid crystal device passes through the polarizer 205, the retardation plate 206, and the scattering plate 207. The light further passes through the color filter 213 and the liquid crystal layer 203 and is then reflected by the reflective films 216. The reflected light is output to the outside via the polarizer 205. In this reflective displaying mode, the intensity of output light is controlled to a bright, dark, or intermediate level in response to the voltage applied to the liquid crystal layer 203.

In the case where an image is displayed in the transmissive displaying mode, light emitted from the backlight is converted by the polarizer 208 and the retardation plate 209 into light with predetermined polarization and introduced into the liquid crystal layer 203 and the color filter 213 via spaces where no reflective film 216 is formed. After that, the light passes through the diffusing plate 207 and the retardation plate 206. In this transmissive displaying mode, the light transmission is controlled by the voltage applied across the liquid crystal layer 203 into a state where the light passes through the polarizer 205 (bright state) or a state where the light is absorbed by the polarizer 205 (dark state) or otherwise into an intermediate state (with intermediate brightness).

The operation of displaying an image is described in further detail below for both the reflective displaying mode and the transmissive displaying mode with reference to FIGS. 5 and 6. FIG. 5 is a front view schematically illustrating a lower transparent substrate 202 used in an active matrix type liquid crystal device including TFDs according to the present invention. TFDs 502 are formed above the respective island-shaped Al reflective films 503 and connected to a scanning line 501 and also to the corresponding ITO transparent electrodes 504 having a slightly greater area than the Al reflective films 503. FIG. 6 is a front view schematically illustrating an example of a lower transparent substrate 202 used in a passive matrix type liquid crystal device according to the present invention. Al reflective films 602 and stripe-shaped ITO transparent electrodes 603 having a slightly greater area than the reflective films 602 are formed on the inner surface of the lower transparent substrate such that they cross stripe-shaped ITO transparent electrodes 601 formed on the inner surface of an upper transparent substrate of a liquid crystal cell.

Figure 5:
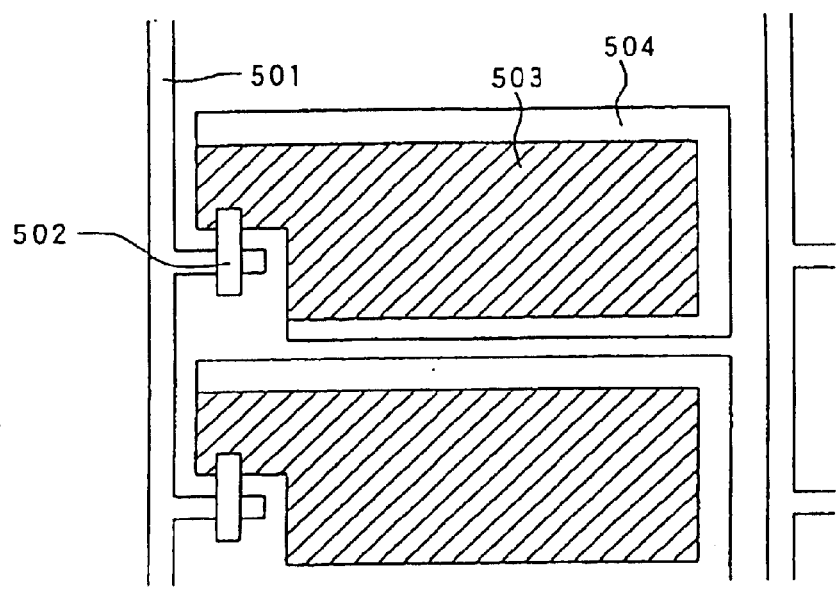
FIG. 5 is a plan view illustrating an example of a transflective film formed of reflective films spaced from one another, used in the liquid crystal device according to the third embodiment of the invention.
Figure 6:
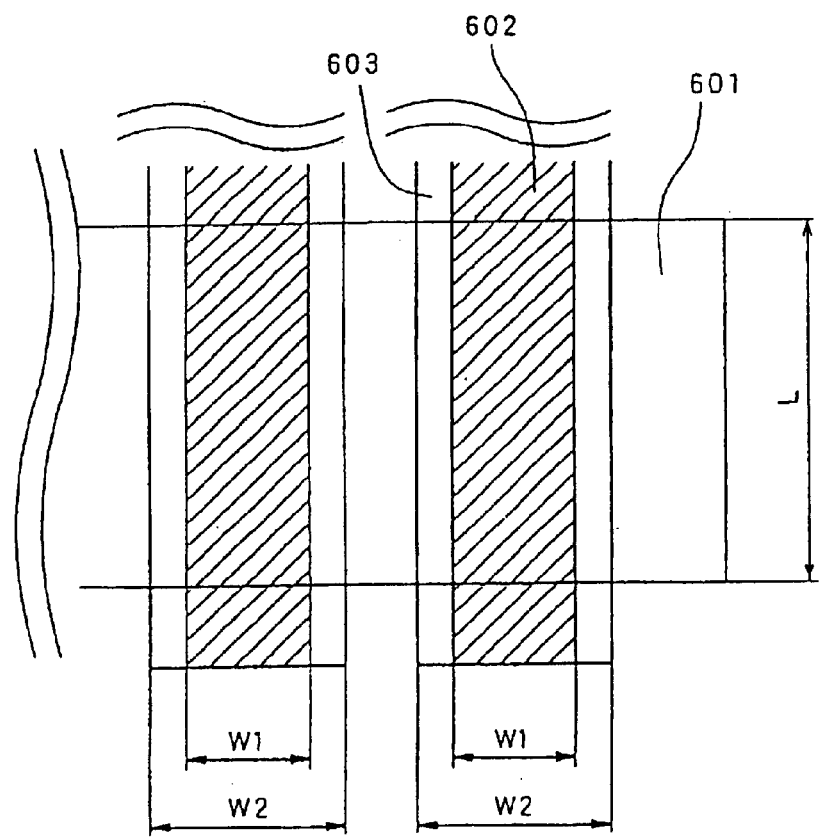
FIG. 6 is a plan view illustrating another example of a transflective film formed of reflective films spaced from one another, used in the third embodiment.

In the reflective displaying mode, ambient light input into the liquid crystal cell is reflected by the reflective films 503 (in the case of FIG. 5) or the reflective films 602 (in the case of FIG. 6). That is, of the ambient light, only the part, which is incident on the reflective films 503 or 602, is modulated according to the voltage applied across the liquid crystal layer. In the transmissive displaying mode, of light input from the backlight into the liquid crystal cell, only the part, which passes through the reflective films 503 or 602, is introduced into the liquid crystal layer. However, light incident upon areas other than the pixel electrodes or the dot electrodes does not make any contribution to displaying an image but causes a reduction in the contrast in the transmissive displaying mode. To avoid this problem, such light is blocked by providing a light shielding film (black matrix layer) or by displaying the image in a normally black mode. That is, in the transmissive displaying mode, an image is displayed by light input from the backlight through the areas where there are only ITO transparent electrodes 504 or 603 but there are no overlapping Al reflective films 503 or 602.

For example, if the ITO transparent electrodes 601 formed on the inner surface of the upper transparent substrate shown in FIG. 6 each have a line width (L) of 198 $\mu$m, the Al reflective films 602 formed on the inner surface of the lower substrate each have a line width (W1) of 46 $\mu$m , and the ITO transparent electrodes 603 formed over the Al reflective films 602 each have a line width (W2) of 56 $\mu$m , then approximately 70% of ambient light introduced into the liquid crystal layer is reflected, and approximately 10% of light input from the backlight into the lower transparent substrate is passed.

By employing the structure disclosed herein in the present embodiment, it is possible to realize a color liquid crystal device capable of switching the displaying mode between the reflective and transmissive modes in any of which a high-brightness and high-contrast image can be displayed without producing double images or dull images.

Furthermore, in the present embodiment, because ambient light which has passed through the spaces between adjacent transparent electrodes 315 (that is, between adjacent pixel) further passes through the spaces between adjacent reflective films 316, ambient light which does not make any contribution to displaying an image (but which causes a reduction in the contrast of the image) does not emerge from the liquid crystal device in mixture with ambient light which makes contribution to displaying the image. Therefore, no degradation occurs in the image quality due to light passing through the spaces between stripe-shaped or island-shaped transparent electrodes.

In the present embodiment, the color filter 213 is formed such that its colored areas are located opposing the transparent electrodes 215. However, the color filter 213 has no light shielding areas at locations corresponding to the spaces between adjacent transparent electrodes 215. Therefore, ambient light can pass through the spaces between adjacent colored areas. However, in the spaces between adjacent colored areas, there is no reflective film 216, which reflects such light. Therefore, mixing of colors between adjacent colored areas of the color filter 213 is prevented, which would otherwise occur due to reflection by the reflective films 216. Thus, a color image is prevented from having dull images or blurring due to mixing of colors. The absence of such a light shielding area results in an improvement in the image brightness in the reflective displaying mode.

Furthermore, in the present embodiment, because the transparent electrodes 215 are formed directly on the reflective films 216, both the Al reflective films 216 and the ITO transparent electrodes 215 serve as electrode lines. This results in a reduction in resistance of each electrode line. Still furthermore, because the Al reflective films 216 are covered with the corresponding ITO transparent electrodes 215, the Al reflective films 216 are prevented from being damaged. Still furthermore, because both the Al reflective films 216 and the ITO transparent electrodes 215 serve as electrode lines, a reduction in resistance is achieved for each electrode line. Preferably, each reflective film 216 contains 95 wt % or more aluminum and has a thickness in the range from 10 nm to 40 nm.

Furthermore, the scattering plate 207 disposed on the upper surface of the liquid crystal cell serves to output light reflected by the Al reflective films 216 such that the light is scattered over a wide range of angles. This makes it possible to realize a liquid crystal device with a wide viewing angle.

Fourth Embodiment

Figure 7:
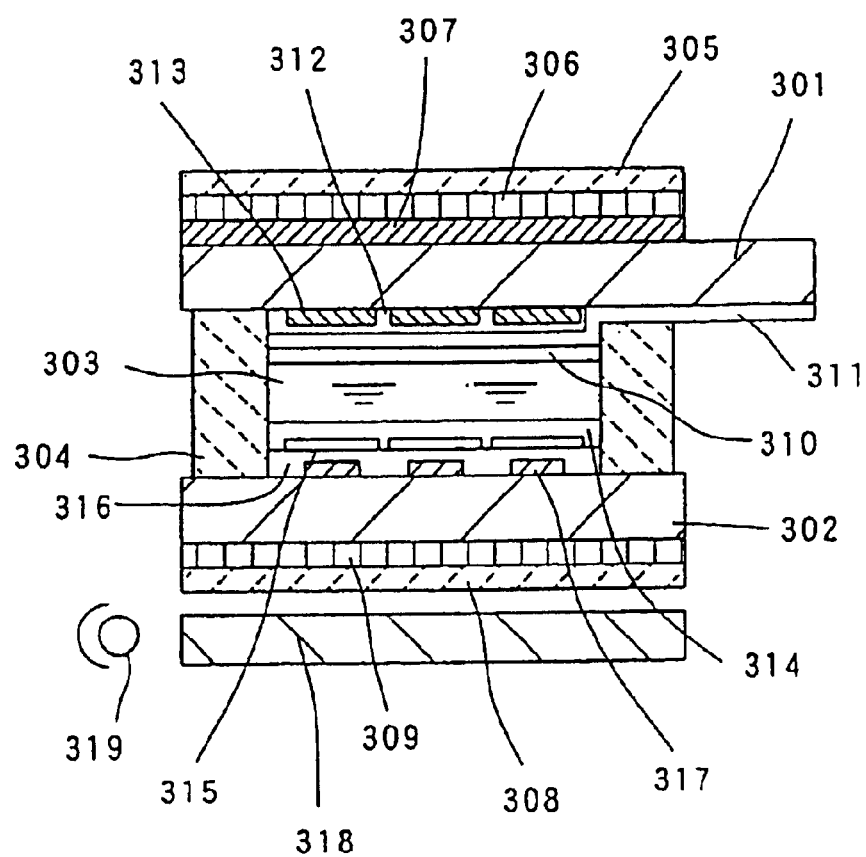
FIG. 7 is a longitudinal sectional view illustrating the general structure of a liquid crystal device according to a fourth embodiment of the invention.

A fourth embodiment of a liquid crystal device according to the present invention is described below with reference to FIG. 7. FIG. 7 is a longitudinal sectional view illustrating the general structure of a liquid crystal device according to a fourth embodiment of the invention. Although this embodiment is basically concerned with a passive matrix type liquid crystal device, the structure disclosed herein may also be applied to other types of liquid crystal devices such as an active matrix type device, a segment type device, etc.:

In the transflective liquid crystal device of the fourth embodiment, as in the third embodiment, there is provided a liquid crystal cell including a liquid crystal layer 303 sealed between two transparent substrates 301 and 302 and within a frame-shaped sealing member 304. The liquid crystal layer 303 is formed of a nematic liquid crystal with a particular twisted angle. A color filter 313 is formed on the inner surface of the upper transparent substrate 301. The color filter 313 includes three colored layers of R, G, and B with predetermined patterns. The surface of the color filter 313 is coated with a transparent protective film 312. A plurality of stripe-shaped transparent electrodes 311 are formed of ITO or the like on the surface of this protective film 312. An alignment layer 310 is formed over the surface of the transparent electrodes 311 and subjected to a rubbing process in a predetermined direction.

On the inner surface of the lower transparent substrate 302, stripe-shaped transparent electrodes 315 slightly greater in area than the reflective films 317 are formed, via a protective film 316, on the stripe-shaped reflective films 317 formed at locations corresponding to the respective colored layers of the color filter 313 described above, wherein a plurality of such transparent electrodes 315 are disposed such that they cross the transparent electrodes 311. In the case of an active matrix type device including TFDs or TFTs, each reflective film 317 and each transparent electrode 315 are formed in rectangular shapes and connected to interconnections via active devices. The reflective film 317 is formed of Cr, Al, Ag, or the like, and the surface thereof serves as a reflection plane for reflecting light incident from the side of the transparent substrate 301. On the surface of the transparent electrode 315, an alignment layer 314 is formed and subjected to a rubbing process in a predetermined direction.

Thus, in this fourth embodiment, the plurality of reflective films 317 are arranged in a stripe fashion such that they are spaced a predetermined distance apart from each other so that the spaces between adjacent reflective films 317 serve to pass light emitted from a backlight.

A polarizer 305 is disposed on the outer surface of the upper transparent substrate 301, and a retardation plate 306 and a scattering plate 307 are disposed between the polarizer 305 and the transparent substrate 301. On the lower side of the liquid crystal cell, a retardation plate 309 is disposed at the back of the transparent substrate 302, and a polarizer 308 is disposed at the back of the retardation plate 309. Furthermore, on the lower side of the polarizer 308, there is disposed a backlight including a fluorescent tube 319 for emitting white light and a light guiding plate 318 having a light incident end face extending along the fluorescent tube 319. The light guiding plate 318 is formed of a transparent material such as acrylic resin in such a manner that its entire back surface becomes rough so as to serve as a scattering surface. Light emitted from the fluorescent tube 319 serving as a light source is input into the light guiding plate 318 through its end face, and light is output substantially uniformly through the upper surface. Other types of backlights such as an LED (light emitting diode) or an EL (electroluminescence) lamp may also be employed.

Referring to FIG. 7, the operation of displaying an image in reflective and transmissive modes according to the present embodiment is described below.

In the reflective displaying mode, ambient light incident from the upper side in FIG. 7 onto the liquid crystal device passes through the polarizer 305, the retardation plate 306, and the scattering plate 307. The light further passes through the color filter 313 and the liquid crystal layer 303 and is then reflected by the reflective films 317. The reflected light is output to the outside via the polarizer 305. In this reflective displaying mode, the image brightness can be controlled by the voltage applied across the liquid crystal layer 303 into a bright, dark, or intermediate state.

In the case where an image is displayed in the transmissive displaying mode, light emitted from the backlight is converted by the polarizer 308 and the retardation plate 309 into light with predetermined polarization and introduced into the liquid crystal layer 303 and the color filter 313 via spaces where no reflective film 317 is formed. After that, the light passes through the scattering plate 307 and the retardation plate 306. In this transmissive displaying mode, the light transmission is controlled by the voltage applied across the liquid crystal layer 303 into a state where the light passes through the polarizer 305 (bright state) or a state where the light is absorbed by the polarizer 305 (dark state) or otherwise into an intermediate state (with intermediate brightness).

The transparent electrodes 315 and the reflective films 317 may be formed, as in the third embodiment, into the shape in the horizontal plane as shown in FIG. 5 for the case of an active matrix type liquid crystal device using TFDs or into the shape as shown in FIG. 6 for the case of a passive matrix type liquid crystal device.

For example, if the ITO transparent electrodes 601 formed on the inner surface of the upper transparent substrate shown in FIG. 6 each have a line width (L) of 240 μm, the Al reflective films 602 formed on the inner surface of the lower substrate each have a line width (W1) of 60 μm, and the ITO transparent electrodes 603 formed over the Al reflective films 602 each have a line width (W2) of 70 μm, then approximately 75 % of ambient light introduced into the liquid crystal layer is reflected, and approximately 8% of light input from the backlight into the lower transparent substrate is passed.

By employing the structure disclosed herein in the present embodiment, it is possible to realize a color liquid crystal device capable of switching the displaying mode between the reflective and transmissive modes in any of which an image can be displayed without producing double images or dull images.

Thus, in this fourth embodiment, each transparent electrode 315 and each corresponding reflective film 317 are disposed opposing each other via the protective film 316. That is, a pair of conductors are disposed on both sides of a dielectric. As a result, a capacitor is formed by these three elements. If the respective reflective films 316 are electrically connected to one another, adjacent transparent electrodes 315 are capacitively coupled to each other via capacitors formed in the above-described manner and via the conductive reflective films 317. In this fourth embodiment, however, because the plurality of conductive reflective films 317 are not electrically connected to one another, the capacitors corresponding to the respective transparent electrodes 315 are isolated from one another, and thus such capacitive coupling does not occur. This prevents image signals applied to the plurality of transparent electrodes 315 from being mixed together or having cross-talk via capacitive coupling. Therefore, a high-quality image can be displayed in the reflective displaying mode without producing waveform distortion.

In this fourth embodiment, image signals are preferably supplied to the transparent electrodes 315 via data lines, a sampling circuit, a data line driving circuit, or the like. The image signals have a complicated waveform and a high driving frequency compared with other signals such as a scanning signal. However, because the plurality of conductive reflective films 317 are electrically isolated from one another, image signals are effectively prevented from being mixed together or having cross-talk via capacitive coupling.

Furthermore, in this fourth embodiment, because the protective film 316 is disposed between the respective transparent electrodes 315 and the corresponding reflective films 317, the reflective films 317 are allowed to be formed of an conductive material such as Al without causing electrical leakage or short circuits among the plurality of transparent electrodes 315 via the reflective films 317. This also allows the pattern, in the horizontal plane, of the reflective films 317 to be designed in a more flexible fashion.

In this embodiment, after forming the protective film 316 over the Al reflective films 317, the ITO transparent electrodes 315 are formed on the protective film 316. Therefore, the Al reflective films 317 are prevented from direct contact with a developing solution or an etching used to form the ITO transparent electrodes 315. Furthermore, the protective film 316 prevents the Al reflective films 317 from being damaged. By electrically connecting the Al reflective films 317 to the ITO transparent electrodes 315, it becomes possible to reduce the probability that electric disconnection occurs, and it also becomes possible to reduce the resistance of the electrode lines.

The scattering plate 307 disposed on the upper surface of the liquid crystal cell serves to output light reflected by the Al reflective films 317 such that the light is scattered over a wide range of angles. This makes it possible to realize a liquid crystal device with a wide viewing angle.

Fifth Embodiment

Figure 8:
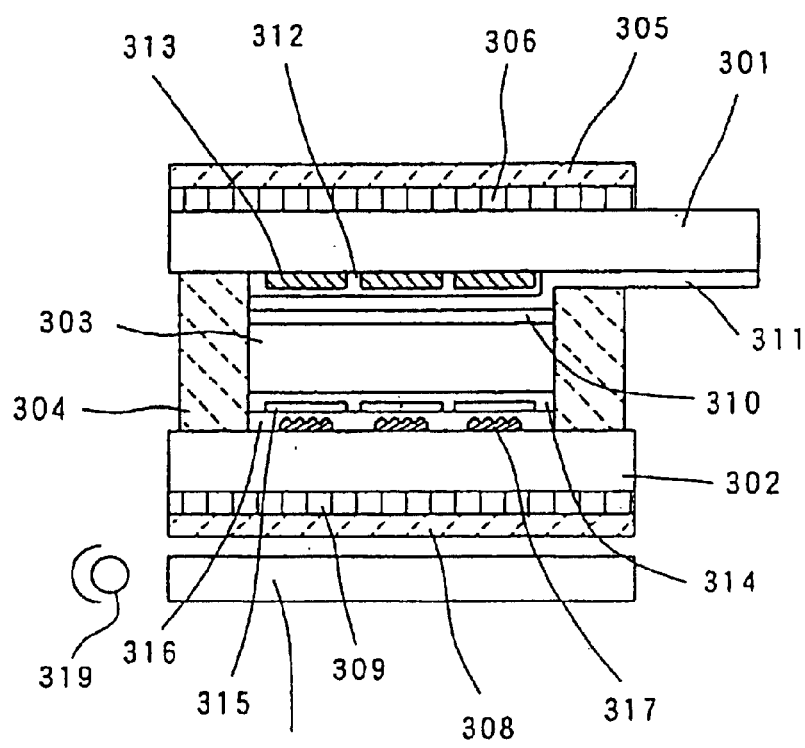
FIG. 8 is a longitudinal sectional view illustrating the general structure of a liquid crystal device according to a fifth embodiment of the invention.

A fifth embodiment of a liquid crystal device according to the present invention is described below with reference to FIG. 8. FIG. 8 is a longitudinal sectional view illustrating the general structure of a liquid crystal device according to a fifth embodiment of the invention. This fifth embodiment is similar in construction to the fourth embodiment described above except that reflective films are formed into a different structure. In FIG. 8, similar constituent elements to those in the fourth embodiment described above with reference to FIG. 7 are denoted by similar reference numerals, and thereby they will be omitted.

In the transflective liquid crystal device according to the fifth embodiment shown in FIG. 8, the reflective films 317' are formed as follows.

First, a photosensitive resist is coated on the inner surface of the transparent substrate 302 using a spin coating technique or the like. The photosensitive resist is then exposed to light with controlled intensity through a mask having small openings. After that, the photosensitive resist is baked as required and then developed so that portions corresponding to the openings of the mask are removed thereby forming a supporting layer having a corrugated shape in cross section. In the above photolithography process, the portions of the photosensitive resist corresponding to the openings of the mask may be removed or left without being removed, and the uneven surface geometry may be smoothed by means of etching or heating thereby achieving a corrugated shape in cross section. An additional layer may be formed on the surface of the supporting layer so as to obtain a smoother surface.

A thin film of metal is then deposited on the surface of the supporting layer by means of evaporation or sputtering thereby forming a metal film having a reflection plane. The thin film is then patterned into the shape of stripes (refer to FIG. 6) or islands (refer to FIG. 5). The metals, which can be employed here, include Al, Cr, Ag, and Au. Because the corrugated shape of the surface of the supporting layer is reflected in the formation of the reflective films 317', the reflective films 317' have a generally rough surface.

By employing the structure disclosed herein in the present embodiment, it is possible to realize a color liquid crystal device capable of switching the displaying mode between the reflective and transmissive modes in any of which an image can be displayed without producing double images or dull images.

In particular, the reflective films 317' whose surface is made uneven is capable of reflecting light over a wide range of angles. This makes it possible to realize a liquid crystal device with a wide viewing angle.

Sixth Embodiment

Figure 9:
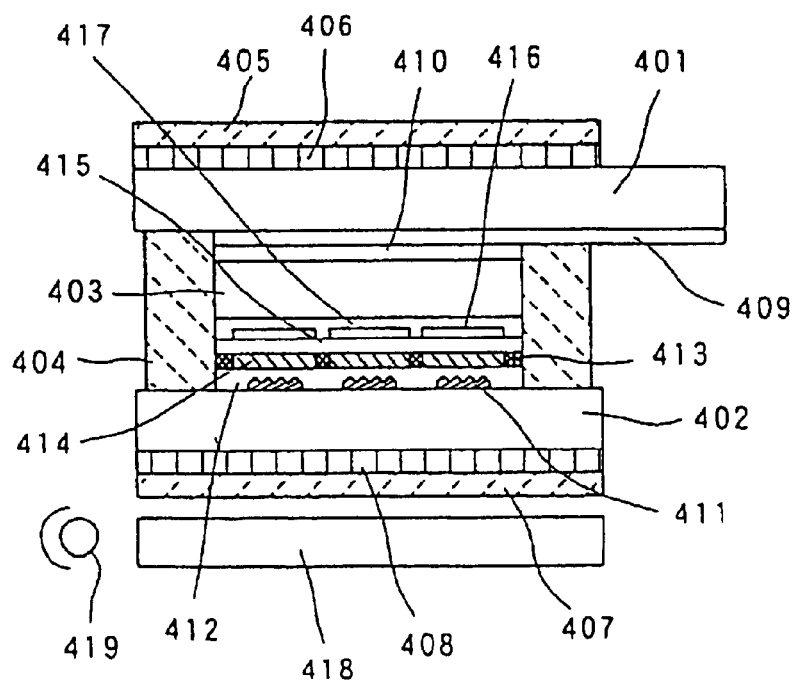
FIG. 9 is a longitudinal sectional view illustrating the general structure of a liquid crystal device according to a sixth embodiment of the invention.

A sixth embodiment of a liquid crystal device according to the present invention is described below with reference to FIGS. 9 to 10b. FIG. 9 is a longitudinal sectional view illustrating the general structure of a liquid crystal device according to a sixth embodiment of the invention. Although this embodiment is basically concerned with a passive matrix type liquid crystal device, the structure disclosed herein may also be applied to other types of liquid crystal devices such as an active matrix type device, a segment type device, etc.

In the transflective liquid crystal device of the sixth embodiment, there is provided a liquid crystal cell including a liquid crystal layer 403 sealed between two transparent substrates 401 and 402 and within a frame-shaped sealing member 404. The liquid crystal layer 403 is formed of a nematic liquid crystal with negative dielectric anisotropy. A plurality of stripe-shaped transparent electrodes 409 are formed of ITO or the like on the inner surface of the upper transparent substrate 401. An alignment layer 410 for aligning the liquid crystal in vertical direction is formed over the transparent electrodes 409 and rubbed in a predetermined direction. The rubbing is performed so those liquid crystal molecules have a pretilt angle of about 85° to the rubbing direction. In the case of an active matrix type device including TFDs or TFTs, each transparent electrode 409 is formed in a rectangular shape and connected to an interconnection via an active device.

On the other hand, a corrugation with a top-to-bottom height of about 0.8 µm is formed of a photosensitive acrylic resin on the inner surface of the lower transparent substrate 402. Aluminum added with 1.0 wt % Nd is sputtered to a thickness of 25 nm onto the surface of the acrylic resign and patterned into the shape of stripes (refer to FIG. 6) or islands (refer to FIG. 5) thereby forming reflective films 411. A color filter 414 is formed over the reflective films 411 via a protective film 412. The color filter 414 includes three colored layers of R, G, and B with predetermined patterns. The surface of the color filter 414 is coated with a transparent protective film 415. A plurality of stripe-shaped transparent electrodes 416 is formed of ITO or the like on the surface of the protective films 415 such that they cross the transparent electrodes 409 for the respective colored layers of the color filters 414. An alignment layer 417 is formed over the transparent electrodes 416. This alignment layer 417 is not subjected to the rubbing process.

A polarizer 405 is disposed on the outer surface of the upper transparent substrate 401, and a retardation plate (quarter-wavelength plate) 406 is disposed between the polarizer 405 and the transparent substrate 401. On the lower side of the liquid crystal cell, a retardation plate (quarter-wavelength plate) 408 is disposed at the back of the transparent substrate 402, and a polarizer 407 is disposed at the back of the retardation plate (quarter-wavelength plate) 408. Furthermore, on the lower side of the polarizer 407, there is disposed a backlight including a fluorescent tube 419 for emitting white light and a light guiding plate 418 having a light incident end face extending along the fluorescent tube 419. The light guiding plate 418 is formed of a transparent material such as acrylic resin in such a manner that its entire back surface becomes rough or printed layer so as to serve as a scattering surface. Light emitted from the fluorescent tube 419 serving as a light source is input into the light guiding plate 418 through its end face, and light is output substantially uniformly through the upper surface. Other types of backlights such as an LED (light emitting diode) or an EL (electroluminescence) lamp may also be employed.

In the present embodiment, to prevent light from leaking through areas between adjacent dots in the transmissive displaying mode, a black matrix layer 413 serving as a light shielding member is formed in a horizontal plane at locations corresponding to the spaces between adjacent colored areas of the color filter 414. The black matrix layer 413 may be formed by coating a Cr layer or may be formed of a photosensitive black resin.

Figure 10A:
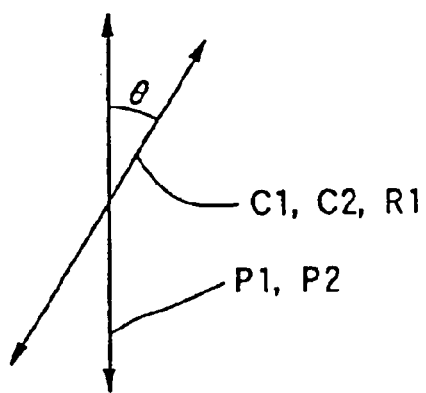
FIG. 10a is a schematic diagram illustrating the relationship in terms of rubbing directions among a polarizer, a retardation plate and a liquid crystal cell of a sixth embodiment.

Herein, as shown in FIG. 10a, the polarizers 40S and 407 are disposed such that their polarization axes P1 and P2 extend in the same direction. The retardation plates (quarter-wavelength plates) 406 and 408 are disposed such that their delayed phase axes C1 and C2 extend in a direction rotated by θ=45° in a clockwise direction relative to the polarization axes P1 and P2 of the polarizers 405 and 407. The alignment layer 410 on the inner surface of the transparent substrate 401 is subjected to a rubbing process in the direction R1 same as the delayed phase axes C1 and C2 of the retardation plates (quarter-wavelength plates) 406 and 408. The rubbing direction R1 determines the direction in which long axes of liquid crystal molecules are tilted when an electric field is applied across the liquid crystal layer 403. A negative nematic liquid crystal is employed to form the liquid crystal layer 403.

Figure 10B:
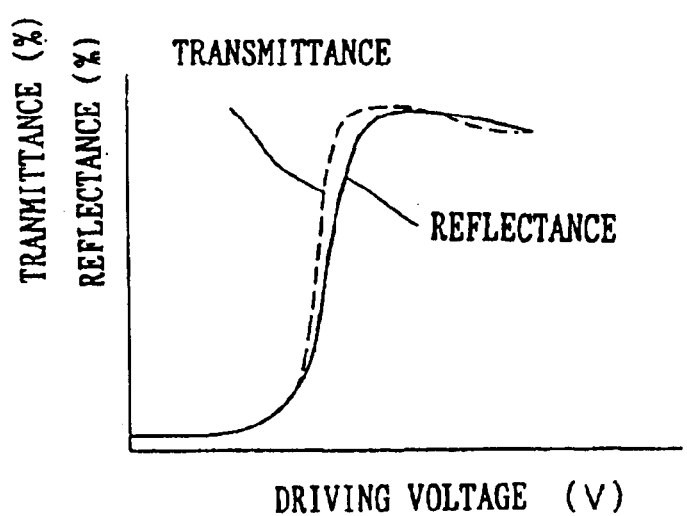

FIG. 10b is a graph illustrating the reflectance R and the transmittance T as a function of the driving voltage obtained when the liquid crystal device according to the present embodiment is used in the reflective displaying mode. Herein, the liquid crystal device is in a dark (black) state when no electric field is applied. When this liquid crystal cell is used, there is no need to form the black matrix layer 413.

Referring to FIG. 9, the operation of displaying an image in reflective and transmissive modes according to the present embodiment is described below.

In the reflective displaying mode, ambient light incident from the upper side in FIG. 9 onto the liquid crystal device passes through the polarizer 405, the retardation plate 406, and the liquid crystal layer 403. The light further passes through the color filter 414 is then reflected by the reflective films 411. The reflected light is output to the outside via the polarizer 405. In this reflective displaying mode, the image brightness can be controlled by the voltage applied across the liquid crystal layer 403 into a bright, dark, or intermediate state.

In the case where an image is displayed in the transmissive displaying mode, light emitted from the backlight is converted by the polarizer 407 and the retardation plate 408 into light with predetermined polarization and introduced into the liquid crystal layer 403 via spaces between adjacent reflective films 411. After that, the light passes through the color filter 414, the liquid crystal layer 403, and the retardation plate 406. In this transmissive displaying mode, the light transmission is controlled according to the voltage applied across the liquid crystal layer 403 into a state where the light passes through the polarizer 405 (bright state) or a state where the light is absorbed by the polarizer 405 (dark state) or otherwise into an intermediate state (with intermediate brightness).

By employing the structure described above with reference to the present embodiment, it is possible to realize a color liquid crystal device capable of switching the displaying mode between the reflective and transmissive modes in any of which an image can be displayed without producing double images or dull images.

In the present embodiment, the reflective films 411 are formed of a metal layer chiefly containing Al. The surface of the reflective films 411 are covered with the protective film 412. Furthermore, the color filter 414, the protective film 415, and the transparent electrodes 416 are formed on the protective film 412. Therefore, the Al metal layer is prevented from coming into direct contact with the developing solutions used to form the ITO film and the color filter and thus the Al metal layer is prevented from being dissolved into the developing solutions. Furthermore, the Al metal layer can be handled without damaging it. For example, a 25 nm thick Al metal layer added with 1.0 wt % Nd has a reflectance of 80% and a transmittance of 10%, and thus it provides good characteristics when used to form the reflective films 411.

Furthermore, the reflective films 411 having an uneven surface can reflect light over a wide range of angles, and thus it is possible to achieve a liquid crystal device having a wide viewing angle.

In the present embodiment, instead of forming the protective film over the reflective films, an insulating film may be formed on the reflective films by performing thermal oxidation or anodization as in the second embodiment or coating an organic material on the reflective films.

In the transflective liquid crystal device according to the above-described embodiments, light emitted from the backlight is transmitted via the spaces between adjacent reflective films. Instead of or in addition to such a structure, small openings or slits may be formed in the reflective film(s) itself (themselves) so that light emitted from the backlight is introduced into the liquid crystal layer via the openings. In this case, for each pixel, one or more openings are formed into the shape of a square, rectangle, slit, circle, or ellipse at regular or irregular intervals. Preferably, the openings are formed such that its total area becomes approximately equal to 10% of the total area of the reflective films. Such openings may be easily formed by a photolithography process including a photoresist coating step, exposure step developing step, and resist removing step, developing step, and resist removing step. The openings may be formed at the same time as the reflective films are formed. This allows the openings to be produced without needing additional processing steps. Whatever shape the openings are formed into, it is desirable that the diameter of each opening be within the range from 0.01 $\mu$m and 20 $\mu$m, and that the total area of the openings relative to the total area of the reflective films be within the range from 5% to 30%.

Seventh Embodiment

Figure 11:
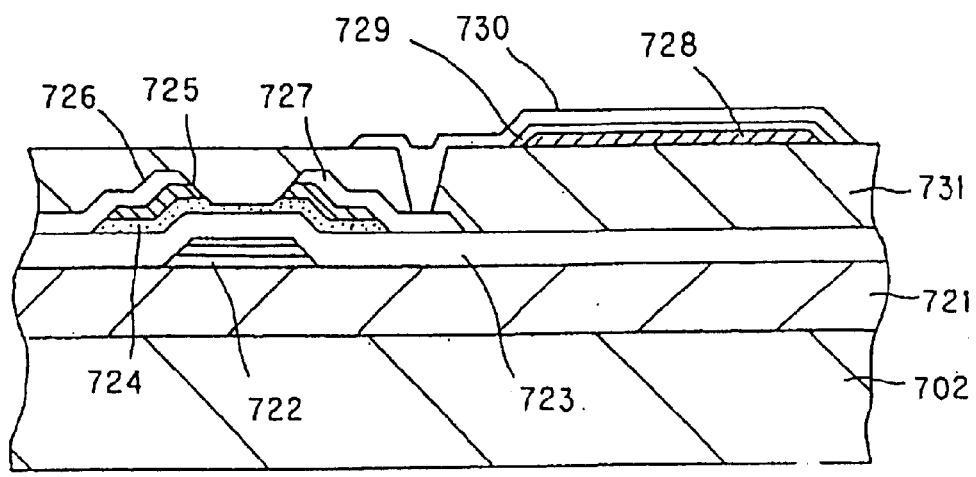
FIG. 11 is a cross-sectional view illustrating in an enlarged fashion a TFT driving device and other elements such as a pixel electrode according to a seventh embodiment of the invention.

A seventh embodiment of a liquid crystal device according to the present invention is described below with reference to FIG. 11. FIG. 11 is a cross-sectional view illustrating in an enlarged fashion a TFT driving device and other elements such as a pixel electrode according to this seventh embodiment of the invention. The structure disclosed here in this seventh embodiment in which TFT driving devices are formed on a substrate and connected to transparent electrodes formed on the TFT driving devices via an insulating film may also be applied to the other embodiments of the present invention.

In the reflective or transflective liquid crystal device according to the eight embodiment, as shown in FIG. 11, an interlayer insulating film 721 is formed on a transparent substrate 702, and a TFT is formed on the interlayer insulating film 721 wherein the TFT includes a gate electrode 722, a gate, insulating film 723, an i-Si layer 724, an n$^+$-Si layer 725, a source electrode 726, and a drain electrode 727. An interlayer insulating film 731 is formed over the TFT, and a reflective film 728 is formed of aluminum on the interlayer insulating film 731. An insulating film 729 is formed on the reflective film 728 by anodizing the reflective film 728. A transparent electrode 730 (pixel electrode) is formed of ITO over the insulating film 729 and connected to the drain electrode 727 via a contact hole.

In this seventh embodiment, because electric power is supplied to each transparent electrode (pixel electrode) 730 via a corresponding TFT as described above, cross-talk between different transparent electrodes 730 is suppressed. This makes it possible to display an image with higher quality. When the TFT is formed using polysilicon, the TFT may be formed in any structure selected from the LDD structure, the offset structure, and the self-aligned structure. The number of gates of the TFT is not limited to one, but the TFT may include two or more gates.

Eighth Embodiment

Figure 12:
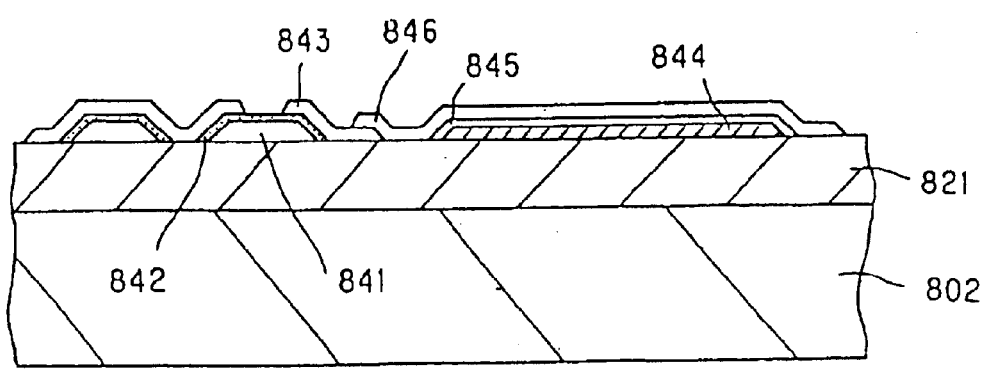
FIG. 12 is a cross-sectional view illustrating in an enlarged fashion a TFD driving device and other elements such as a pixel electrode according to an eighth embodiment of the invention.

An eighth embodiment of a liquid crystal device according to the present invention is described below with reference to FIG. 12. FIG. 12 is a cross-sectional view illustrating in an enlarged fashion a TFD driving device and other elements such as a pixel electrode according to an eighth embodiment of the invention. The structure disclosed here in this eighth embodiment in which TFD driving elements are formed on a substrate and connected to transparent electrodes formed on the TFT driving elements via an insulating film may also be applied to the other embodiments of the present invention.

In the reflective or transflective liquid crystal device according to the eighth embodiment, as shown in FIG. 12, an interlayer insulating film 821 is formed on a substrate 802, and a first conductive layer 841 is formed of tantalum on the interlayer insulating film 821. An insulating layer 842 is formed on the first conductive layer 842 by anodizing tantalum. A second conductive layer 842 is formed of chromium on the insulating layer 842. Furthermore, a reflective film 844 is formed of aluminum on the interlayer insulating film 821, and an insulating film 845 is formed on the reflective film 844 by anodizing the evaporated reflective film 844. A transparent electrode (pixel electrode) 846 is formed on the insulating film 845 and connected to the second conductive layer 843.

In this eight embodiment, because electric power is supplied to each transparent electrode (pixel electrode) 846 via a corresponding TFD as described above, cross-talk between different transparent electrodes 846 is suppressed. This makes it possible to display an image with higher quality. Instead of the TFD shown in the figure, ZnO (zinc oxide) varistor, MSI (metal semi-insulator) driving device, or a two-terminal non-linear device having two-way diode characteristics such as a RD (ring diode) may also be employed.

In this eighth embodiment, the TFD may be disposed on the side, from which ambient light is input, of the transparent substrate and stripe-shaped reflective films and transparent electrodes may be formed on the side, from which light emitted from the backlight is input, of the transparent substrate to obtain similar effects.

Figure 13:
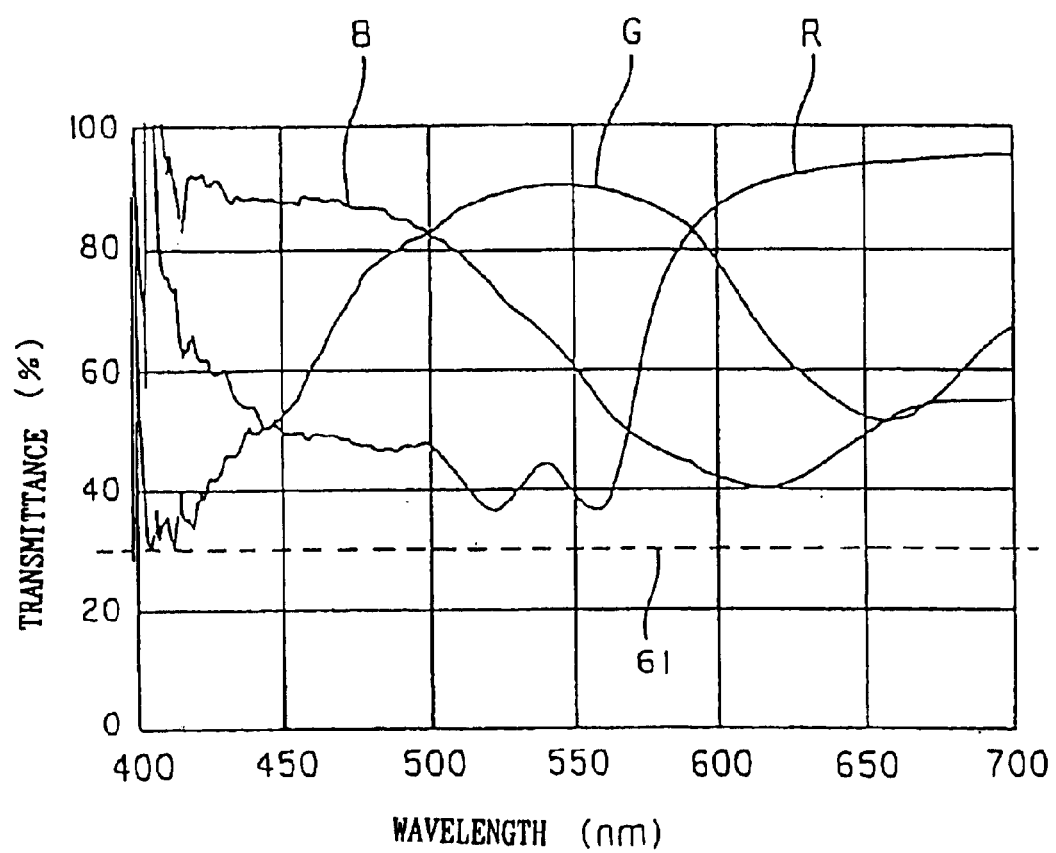
FIG. 13 is a graph illustrating the light transmittance of the respective colored layers of the color filter employed in the respective embodiments.

Referring now to FIG. 13, the colored layers of the color filter 213, 313, or 414 used in the first to eighth embodiments are described below. FIG. 13 is graph illustrating the transmittance of the respective colored layers of the color filter 213 or the like. In any embodiment, when an image is displayed in the reflective displaying mode, incident light passes through one of colored layers of the color filter 213 or the like and further passes through the liquid crystal layer. The light is then reflected by the reflective films and passes again through one of the colored layers. After that, the light is output to the outside. Thus, as opposed to usual reflective liquid crystal devices, light passes twice through the color filter 213 or the like. Therefore, if a usual type color filter is employed, the brightness and the contrast of an image displayed become low. In each embodiment, to avoid such a problem, the color filter 213 or the like is formed to have lightly colored layers of R, G, and B each having minimum transmittance 61 in the visible region which sets to 25 to 50%, as shown in FIG. 13. The lightly colored layers may be obtained by reducing the thickness of each colored layer or by reducing the concentration of pigments or dyes contained in the respective colored layers. The employment of the lightly colored layers makes it possible to display an image in the reflective displaying mode without causing a reduction in the brightness.

The employment of the color filter 213 having lightly colored layers causes the displayed image to have lighter colors in the transmissive displaying mode because light passes only once through the color filter 213 in the transmissive displaying mode. This is desirable in that a brighter image can be obtained, if the fact that in any embodiment a large amount of light emitted from the backlight is blocked by the reflective films is considered.

Ninth Embodiment

A ninth embodiment of the present invention is described below with reference to FIG. 14. This ninth embodiment is concerned with electronic apparatuses each including a liquid crystal device according one of the first to eighth embodiments described above. That is, the ninth embodiment is concerned with various types of electronic apparatus in which a reflective or transflective liquid crystal device according to one of the first to eighth embodiments is advantageously used as a display unit of portable devices which need to operate with low electric power in various environments. FIG. 14 illustrates three examples of electronic apparatuses according to the present invention.

Figure 14A:
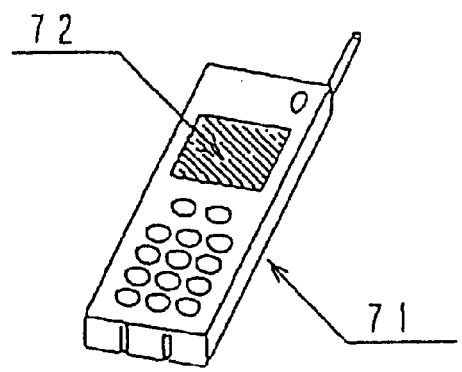
FIG. 14 is a perspective view schematically illustrating various electronic apparatuses according to a ninth embodiment of the present invention.

FIG. 14(a) illustrates a portable telephone including a display unit 72 disposed on the upper side of the front panel of a main body 71. Portable telephones are used indoors and outdoors under various conditions. In particular, portable telephones are often used in cars. When a portable telephone is used in a car at nighttime, the inside of the car is very dark. Therefore, for use as the display unit in the portable telephone, it is desirable to employ a transflective liquid crystal device capable of displaying an image in the reflective displaying mode with low power consumption in most cases and also capable of displaying an image in the transmissive displaying mode using auxiliary light as required. If the liquid crystal device according to one of the first to eighth embodiments is employed as the display unit 72 of the portable telephone, the display unit 72 of the portable telephone can display an image with a higher brightness and a higher contrast in both the reflective and transmissive displaying mode than can be obtained by a conventional portable telephone.

Figure 14B:
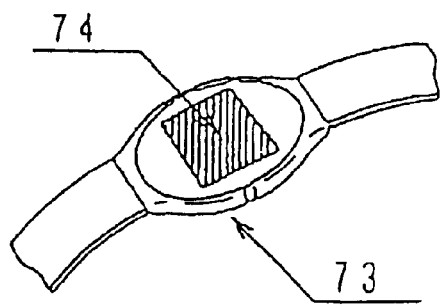

FIG. 14(b) illustrates a watch including a display unit 74 disposed in the center of the main body 73. An important item required for watches is a high-class appearance. If a liquid crystal according to one of the first to eighth embodiments of the present invention is employed as the display unit 74 of a watch, not only a high brightness and a high contrast are achieved but also coloring is minimized because variations in characteristics depending on the wavelength of light are small. Thus, it is possible to realize a watch with a color display unit having an extremely high-class appearance compared to conventional watches.

Figure 14C:
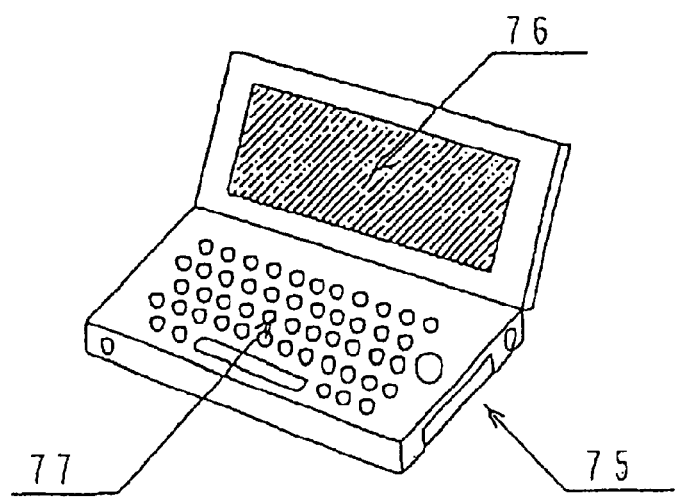

FIG. 14(c) illustrates a portable information device including a display unit 76 disposed on the upper side of the main body 75 and an input unit 77 disposed on the bottom side. In most cases, a touch key is provided on the front surface of the display unit 76. In general, the touch key is difficult to see because of large surface reflection. To reduce such a difficulty, a transmissive liquid crystal device is employed in many cases as the display unit even in portable type devices. However, the transmissive liquid crystal device consumes large electric power because the backlight is always used. Therefore, the battery life is short. Also in this case, a liquid crystal device according to one of the first to eighth embodiments can be advantageously employed as the display unit 76 of the portable information device thereby ensuring that a bright and clear image is displayed in any displaying mode, reflective, transflective, or transmissive mode.

The liquid crystal device according to the present invention is not limited to those described above with reference to particular embodiments. Various modifications are possible without departing the spirit and the scope defined in the claims or read from the description. It should be understood that any liquid crystal device with such a modification also falls within the scope of the present invention.

Industrial Applicability

The liquid crystal device according to the present invention can be employed to realize various types of display devices capable of displaying an image with a high brightness and a high contrast. The liquid crystal device according to the present invention can also be employed as a display unit in various electronic apparatuses. The electronic apparatus including the liquid crystal device according to the present invention can be used as a liquid crystal television set, a video tape recorder with a view-finder or a minitor display, a car navigation system, an electronical personal organizer, an electronic calculator, a word processor, an engineering workstation, a portable telephone, a vidio telephone, a POS terminal, a touch panel, etc.

What is claimed is:

1. A liquid crystal device comprising:

first and second substrates, a liquid crystal layer disposed between said first and second substrates;

a plurality of transparent electrodes which are formed above a surface of said second substrate on the side of said liquid crystal layer, said plurality of transparent electrodes being spaced from each other in a horizontal direction when seen in a direction perpendicular to said second substrate; and a plurality of reflective films formed between said plurality of transparent electrodes and said second substrate, in areas opposing respective ones of said plurality of transparent electrodes, said plurality of transparent electrodes being formed directly on said reflective films, wherein said transparent electrodes are also formed in at least some part of a space between the plurality of reflective films.

2. The liquid crystal device according to claim 1, wherein said reflective films are arranged in correspondence with respective ones of said plurality of transparent electrodes.

3. The liquid crystal device according to claim 1, further comprising a color filter formed on at least one of said first and second substrates, said color filter including colored areas opposing respective ones of said transparent electrodes, wherein said color filter includes no light shielding area in an area opposing at least some part of a space between said transparent electrodes.

4. The liquid crystal device according to claim 1, wherein said reflective films further comprise insular reflectors further comprise insular.

5. A liquid crystal device comprising:

a first substrate;

a second substrate disposed opposite to said first substrate;

a liquid crystal layer disposed between said first and second substrates;

a plurality of reflectors formed on said second substrate on the side of said liquid crystal layer, said reflectors being spaced apart from each other; and a plurality of transparent electrodes formed on respective ones of said reflectors, wherein said transparent electrodes are also formed in at least some part of a space between the plurality of reflectors.

6. The liquid crystal device of claim 5 further comprising a color filter on respective ones of said plurality of transparent electrodes.

7. The liquid crystal devices of claim 6, wherein said color filter are not disposed between said transparent electrodes.

8. The liquid crystal devices of claim 6, wherein said color filters are also formed in an area opposing at least some part of a space between the plurality of reflectors.

9. The liquid crystal devices of claim 5 further comprising a plurality of switching elements, each of said switching elements being connected with respective ones of said transparent electrodes.

10. The liquid crystal device according to claim 5, wherein said reflectors further comprise insular.

11. A liquid crystal device comprising:

a first substrate;

a second substrate disposed opposite to said first substrate;

a liquid crystal layer disposed between said first and second substrates;

a plurality of transflector formed on said second substrate on the side of said liquid crystal layer, said transflectors being spaced from each other;

a plurality of transparent electrodes formed on respective ones of said transflectors; and a backlight positioned on an opposite side of said second substrate with respect to said liquid crystal layer, wherein said transparent electrodes are also formed in at least some part of a space between the plurality of transflectors.

12. The liquid crystal device of claim 11 further comprising:

a polarizer disposed between said second substrate and said backlight; and a retardation film disposed between said second substrate and said polarizer.

13. The liquid crystal device of claim 11, further comprising a color filter disposed on respective ones of said transparent electrodes.

14. The crystal devices of claim 13, wherein said color filters are also formed in an area opposing at least some part of a space between the plurality of transflectors.

15. The liquid crystal device of claim 11 further comprising a plurality of switching elements, each of said switching elements being connected with respective ones of said transparent electrodes.

16. The liquid crystal device of claim 11, wherein said transflectors further comprise a reflective film having an opening.

17. The liquid crystal device according to claim 11, wherein said transflectors further comprise insular.

18. An electronic device comprising:

a main body; and a display unit including a liquid crystal device, said liquid crystal device including:

a first substrate;

a second substrate disposed opposite to said first substrate;

a liquid crystal layer disposed between said first and second substrates;

a plurality of reflectors formed on said second substrate on the side of said liquid crystal layer, said reflectors being spaced from each other; and a plurality of transparent electrodes formed on said plurality of reflectors, wherein said transparent electrodes are also formed in at least some part of a space between the plurality of reflectors.

19. An electronic device, comprising:

a main body; and display unit including a liquid crystal device, said liquid crystal device including:

a first substrate;

a second substrate disposed opposite to said first substrate;

a liquid crystal layer disposed between said first and second substrates;

a plurality of transflectors formed on said second substrates on the side of said liquid crystal layer, said transflectors being spaced from each other;

a plurality of transparent electrodes formed on said transflectors; and a backlight positioned on an opposite side of said second substrate with respect to said liquid crystal layer, wherein said transparent electrodes are also formed in an area opposing at least some part of a space between the plurality of transflectors.

* * * * *

UNITED STATES PATENT AND TRADEMARK OFFICE
CERTIFICATE OF CORRECTION

PATENT NO. : 6,873,383 B1
APPLICATION NO. : 09/445523
DATED : March 29, 2005
INVENTOR(S) : Tsuyoshi Maeda et al.

It is certified that error appears in the above-identified patent and that said Letters Patent is hereby corrected as shown below:

| | |
|---|---|
| Col 7, Line 1 | First "diode" should be --transistors-- |
| Col. 11, Line 21 | Delete "a" |
| Col. 12, Line 20 | "th e" should be --the-- |
| Col. 12, Line 35 | "T his" should be --This-- |
| Col. 13, Line 15 | Before "coupling" insert --capacitive-- |
| Col. 15, Line 16 | "It" should be --If-- |
| Col. 21, Line 65 | "40S" should be --405-- |
| Col. 23, Line 48 | "eight" should be --eighth-- |
| Col. 24, Line 23 | "842" should be --841-- |
| Col. 24, Line 24 | "842" should be --843-- |
| Col. 24, Line 32 | "eight" should be --eighth-- |
| Col. 24, Line 49 | After "is" insert --a-- |
| Col. 25, Line 19 | After "according" insert --to-- |
| Col. 26, Line 28 | "minitor" should be --monitor-- |
| Col. 26, Lines 66-67 | Delete "reflectors further comprise insular" |
| Col. 27, Line 11 | After "formed" insert --directly-- |
| Col. 27, Line 37 | "transflector" should be --transflectors-- |
| Col. 27, Line 40 | After "formed" insert --directly-- |
| Col. 27, Line 47 | "transflectors" should be --reflectors-- |
| Col. 28, Line 27 | After "formed" insert --directly-- |
| Col. 28, Line 44 | After "formed" insert --directly-- |

Signed and Sealed this

Eighth Day of August, 2006

JON W. DUDAS
*Director of the United States Patent and Trademark Office*